US012634237B2

(12) United States Patent
Zheng et al.

(10) Patent No.: US 12,634,237 B2
(45) Date of Patent: May 19, 2026

(54) METHOD AND APPARATUS FOR DETERMINING HASH ALGORITHM INFORMATION FOR LOAD BALANCING, AND STORAGE MEDIUM

(71) Applicant: HUAWEI TECHNOLOGIES CO., LTD., Shenzhen (CN)

(72) Inventors: Hewen Zheng, Nanjing (CN); Xiaojun Zhang, Shenzhen (CN); Xianjun He, Chengdu (CN); Lei Cui, Shenzhen (CN); Lei Han, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 100 days.

(21) Appl. No.: 18/430,159

(22) Filed: Feb. 1, 2024

(65) Prior Publication Data

US 2024/0179095 A1 May 30, 2024

Related U.S. Application Data

(63) Continuation of application No. PCT/CN2022/106253, filed on Jul. 18, 2022.

(30) Foreign Application Priority Data

Aug. 3, 2021 (CN) .......................... 202110887822.6

(51) Int. Cl.
 *H04L 47/125* (2022.01)
 *H04L 45/24* (2022.01)
(52) U.S. Cl.
 CPC .......... *H04L 47/125* (2013.01); *H04L 45/245* (2013.01)
(58) Field of Classification Search
 CPC ..... H04L 47/125; H04L 45/245; H04L 47/12; H04L 49/25; Y02D 30/50
 See application file for complete search history.

(56) References Cited

U.S. PATENT DOCUMENTS

| | | | | |
|---|---|---|---|---|
| 2015/0078375 A1* | 3/2015 | Hendel | ............... | H04L 45/7453 |
| | | | | 370/389 |
| 2020/0007448 A1* | 1/2020 | Mizrahi | ............... | H04L 47/125 |
| 2021/0336884 A1* | 10/2021 | Wang | ................... | H04L 45/125 |

FOREIGN PATENT DOCUMENTS

| | | |
|---|---|---|
| CN | 102571558 A | 7/2012 |
| CN | 103414651 A | 11/2013 |

(Continued)

OTHER PUBLICATIONS

T.-L. Yang, C.-H. Lin, W.-L. Chen, H.-Y. Lin, C.-S. Su and C.-K. Liang, "Hash Transformation and Machine Learning-Based Decision-Making Classifier Improved the Accuracy Rate of Automated Parkinson's Disease Screening," (Year: 2020).*

(Continued)

*Primary Examiner* — Messeret F Gebre
(74) *Attorney, Agent, or Firm* — Leydig, Voit & Mayer, Ltd

(57) ABSTRACT

A method and an apparatus for determining hash algorithm information for load balancing, and a storage medium are provided, to determine, based on first hash algorithm information of a first communication device and information about a first quantity of first ports of the first communication device, second hash algorithm information that is used for load balancing and that is of a second communication device. In this application, a load balancing device receives a first message, where the first message includes the first hash algorithm information of the load balancing mode of the first communication device and the information about the first quantity of first ports of the first communication device. The load balancing device determines the second hash algorithm information of the load balancing mode of (Continued)

the second communication device based on the first hash algorithm information and the information about the first quantity.

17 Claims, 13 Drawing Sheets

(56)                References Cited

FOREIGN PATENT DOCUMENTS

| CN | 107682268 | A | 2/2018 |
| CN | 112702277 | A | 4/2021 |
| CN | 114070797 | A | 2/2022 |

OTHER PUBLICATIONS

R. Sarath, A. S. Nargunam and R. P. Sumithra, "Dual channel authentication in cryptography using quantum stratagem," 2012 International Conference on Computing, Electronics and Electrical Technologies (ICCEET), Nagercoil, India, 2012, pp. 1044-1048 (Year: 2012).*

Xu et al., "Hashing Design in Modern Networks: Challenges and Mitigation Techniques," Proceedings of the 2022 USENIX Annual Technical Conference, Carlsbad, CA, USA, XP061071783, Total 15 pages, USENIX The Advanced Computing Systems Association (Jul. 11-13, 2022; Server date: Jul. 19, 2022).

"Load Balancing Hash Algorithms," Huawei Technologies Co., Ltd., XP093164413, Total 5 pages (Nov. 17, 2020).

Krishnan et al., "Mechanisms for Optimal LAG/ECMP Component Link Utilization in Networks; draft-krishnan-opsawg-large-flow-load-balancing-06.txt," Internet Engineering Task Force, XP015091570, pp. 1-20 (Mar. 2013; Server date: Apr. 1, 2013).

Guo et al., "RDMA over Commodity Ethernet at Scale," SIGCOMM '16, Florianopolis, Brazil, total 14 pages (Aug. 2016).

"Draft Standard for Local and Metropolitan Area Networks-Bridges and Bridged Networks-Amendment: Congestion Isolation," Sponsor LAN/MAN Standards Committee of the IEEE Computer Society, P802.1Qcz, total 27 pages, Institute of Electrical and Electronics Engineers, New York, New York (Mar. 11, 2019).

"Cyclic redundancy check," Wikipedia, URL:https://en.wikipedia.org/wiki/Cyclic_redundancy_check, total 12 pages (Sep. 2024).

Coltun, "The OSPF Opaque LSA Option," Network Working Group, Request for Comments: 2370, See Also: 2328, Category: Standards Track, total 15 pages (Jul. 1998).

Lapukhov et al., "Use of BGP for Opaque Signaling draft-lapukhov-bgp-opaque-signaling-03," Inter-Domain Routing, Internet-Draft, Intended status: Standards Track, total 9 pages (Oct. 31, 2016).

* cited by examiner

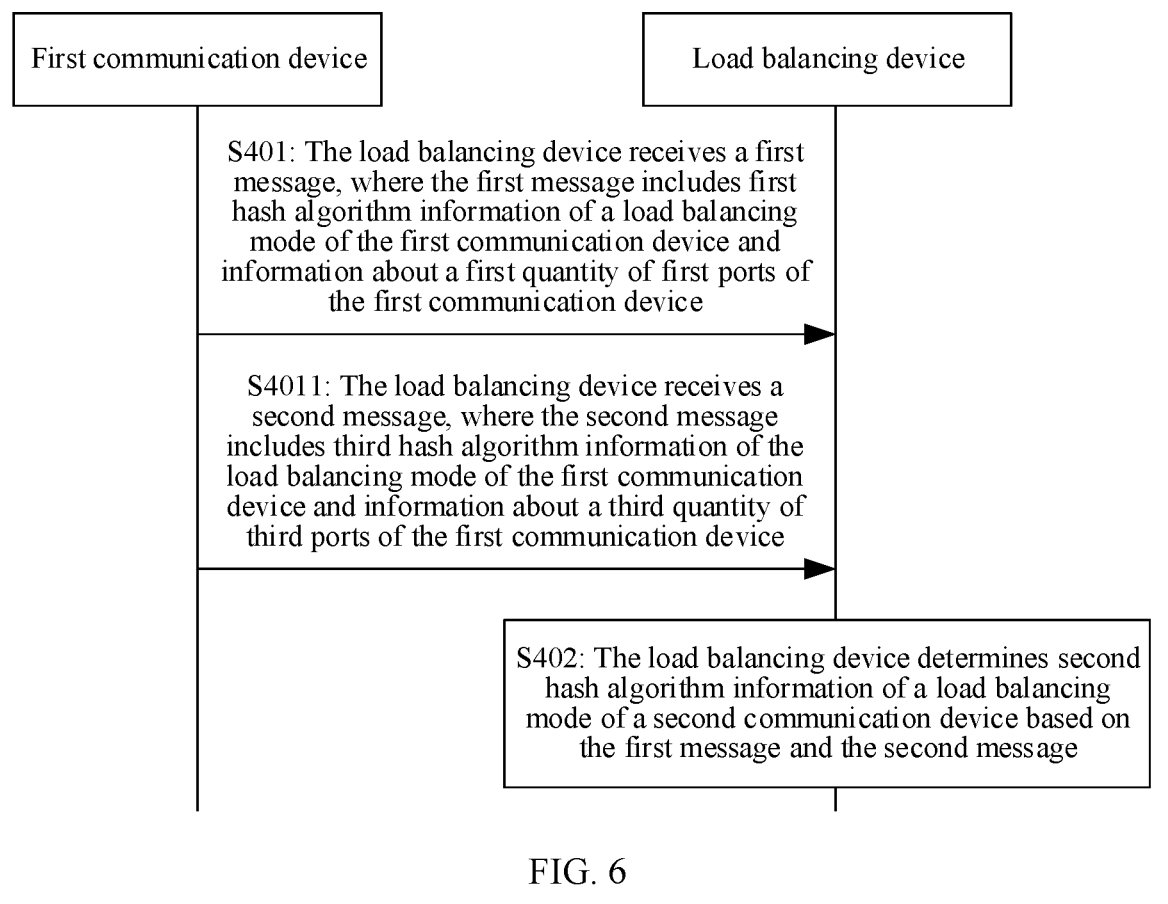

| First communication device | | Load balancing device |
| --- | --- | --- |

S401: The load balancing device receives a first message, where the first message includes first hash algorithm information of a load balancing mode of the first communication device and information about a first quantity of first ports of the first communication device S4011: The load balancing device receives a second message, where the second message includes third hash algorithm information of the load balancing mode of the first communication device and information about a third quantity of third ports of the first communication device S402: The load balancing device determines second hash algorithm information of a load balancing mode of a second communication device based on the first message and the second message

FIG. 6

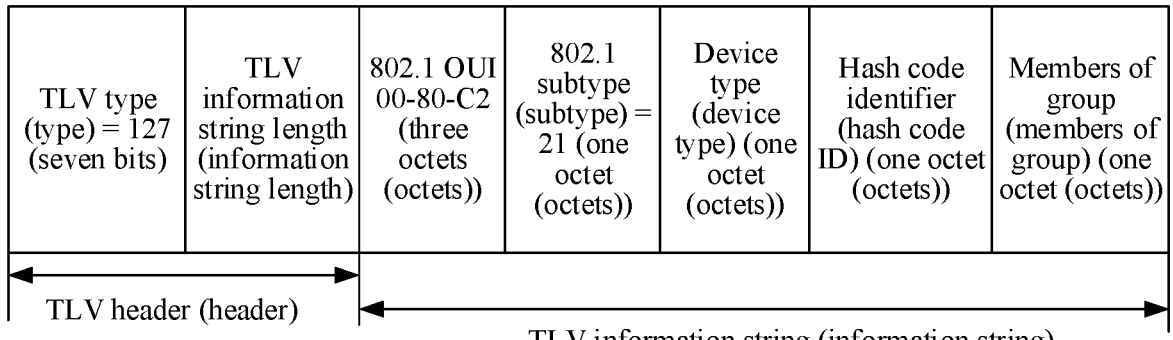

| TLV type (type) = 127 (seven bits) | TLV information string length (information string length) | 802.1 OUI 00-80-C2 (three octets (octets)) | 802.1 subtype (subtype) = 21 (one octet (octets)) | Device type (device type) (one octet (octets)) | Hash code identifier (hash code ID) (one octet (octets)) | Members of group (members of group) (one octet (octets)) |
|---|---|---|---|---|---|---|

TLV header (header)

TLV information string (information string)

FIG. 8A

| LS age (age) | Options (options) | 9 |
|---|---|---|
| Opaque type (opaque type) | Opaque identifier (opaque ID) | |
| | | |
| LS sequence number (sequence number) | | |
| LS checksum (checksum) | Length (length) | |
| Device type (device type) | Hash code identifier (hash code ID) | Members of group (members of group) |

FIG. 8B

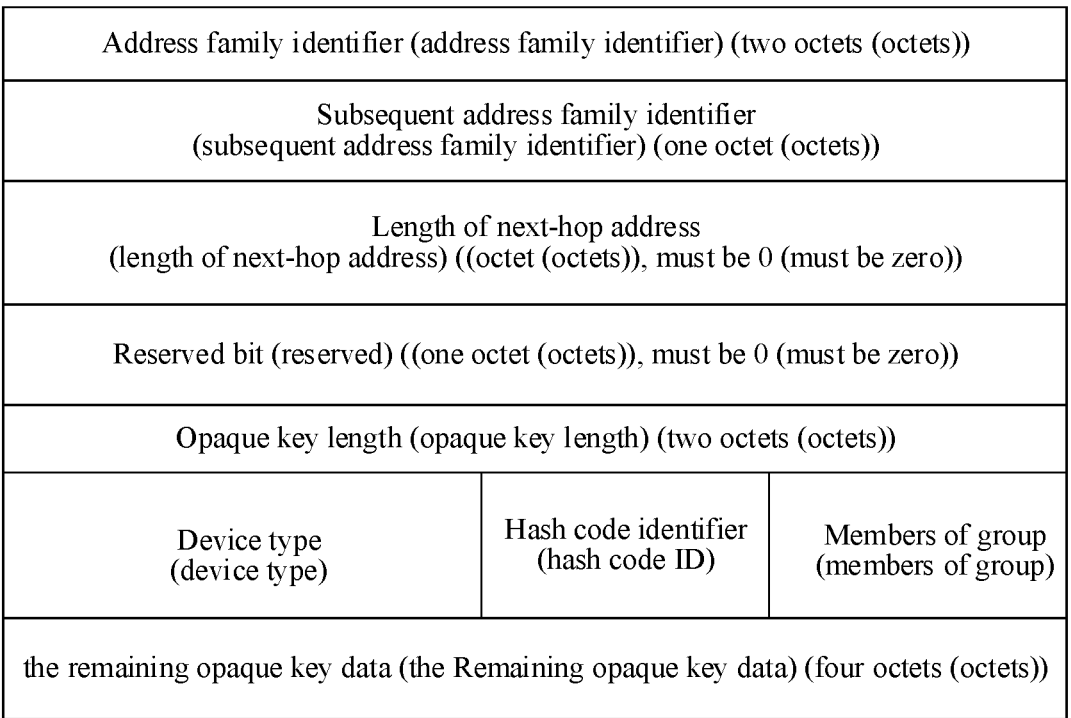

| Address family identifier (address family identifier) (two octets (octets)) | | |
| --- | --- | --- |
| Subsequent address family identifier (subsequent address family identifier) (one octet (octets)) | | |
| Length of next-hop address (length of next-hop address) ((octet (octets)), must be 0 (must be zero)) | | |
| Reserved bit (reserved) ((one octet (octets)), must be 0 (must be zero)) | | |
| Opaque key length (opaque key length) (two octets (octets)) | | |
| Device type (device type) | Hash code identifier (hash code ID) | Members of group (members of group) |
| the remaining opaque key data (the Remaining opaque key data) (four octets (octets)) | | |

FIG. 8C

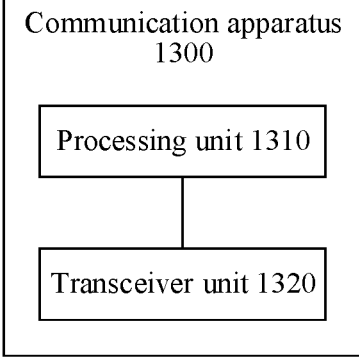

Communication apparatus
1300

Processing unit 1310

Transceiver unit 1320

FIG. 9

METHOD AND APPARATUS FOR DETERMINING HASH ALGORITHM INFORMATION FOR LOAD BALANCING, AND STORAGE MEDIUM

CROSS-REFERENCE TO RELATED APPLICATIONS

This application is a continuation of International Application No. PCT/CN2022/106253, filed on Jul. 18, 2022, which claims priority to Chinese Patent Application No. 202110887822.6, filed on Aug. 3, 2021. The disclosures of the aforementioned applications are hereby incorporated by reference in their entirety.

TECHNICAL FIELD

Embodiments of this application relate to the wireless communications field, and in particular, to a method and an apparatus for determining hash algorithm information for load balancing, and a storage medium.

BACKGROUND

Load balancing, also referred to as load balance or load sharing, is a method of evenly forwarding traffic through a plurality of links. Load balancing is typically used to improve an overall processing capability of a network, and can expand a network bandwidth, increase a network throughput, enhance a data processing capability, and improve network availability without changing an existing network structure.

In existing load balancing, the following balancing method is usually used: extracting an integrated bit sequence from a data packet to obtain a load balancing parameter, then calculating a hash value of the packet by using a fixed hash algorithm (for example, a cyclic redundancy check (CRC) algorithm), then performing a modulo operation on the obtained hash value based on a quantity of ports to obtain a hash modulus value, and forwarding the packet via a physical port corresponding to the hash modulus value.

In cloud computing and data center application networks, top of rack (TOR) switch/leaf (leaf) layer-2 networking or TOR switch/leaf/spine (spine) layer-3 networking is typically used due to scale requirements. In multi-level networking, how to select hash algorithm information for a communication apparatus becomes an urgent problem to be resolved.

SUMMARY

This application provides a method and an apparatus for determining hash algorithm information for load balancing, and a storage medium, to determine, based on first hash algorithm information of a first communication device and information about a first quantity of first ports of the first communication device, second hash algorithm information that is used for load balancing and that is of a second communication device.

According to a first aspect, this application provides a method for determining hash algorithm information for load balancing. In the method, a load balancing device receives a first message, where the first message includes first hash algorithm information of a load balancing mode of a first communication device and information about a first quantity of first ports of the first communication device. The load balancing device determines second hash algorithm information of a load balancing mode of a second communication device based on the first hash algorithm information and the information about the first quantity.

Because the load balancing device can obtain the first hash algorithm information used by the first communication device for load balancing and the information about the first quantity of first egress ports of the first communication device, the second hash algorithm information can be more properly determined based on the first hash algorithm information and the information about the first quantity.

In a possible implementation, the load balancing device may determine the second hash algorithm information based on the first hash algorithm information, the information about the first quantity, and information about a second quantity of second ports of the second communication device. In a process of performing load balancing on a packet, the second communication device needs to perform a modulo operation on the second quantity by using a hash value calculated based on the second hash algorithm information, to determine, based on a hash modulus value obtained, an egress port corresponding to the packet. In other words, the second quantity affects allocation of packets of the second communication device to the ports. Therefore, the second hash algorithm information can be more properly determined with reference to the quantity of ports of the second communication device.

In a possible implementation, the first communication device performs a modulo operation on the first quantity by using a hash value when performing load balancing, and the second communication device performs a modulo operation on the second quantity by using a hash value when performing load balancing. Therefore, when the first quantity is different from the second quantity, the first hash algorithm information and the second hash algorithm information may be different or may be the same. Even if the first hash algorithm information is the same as the second hash algorithm information, for packets that are obtained after balancing is performed based on the first hash algorithm information and the first quantity and that are received by the second communication device, the second communication device may also send a plurality of received packets through different links. Therefore, a network polarization phenomenon can be alleviated.

In another possible implementation, the first quantity is the same as the second quantity, and the first hash algorithm information is different from the second hash algorithm information. In this case, for packets that are received by the second communication device and that are obtained after balancing is performed based on the first hash algorithm information and the first quantity, the second communication device may also send a plurality of received packets through different links. Therefore, a network polarization phenomenon can be alleviated.

In a possible implementation, the first hash algorithm information includes at least one of the following: a first hash algorithm, a parameter item of first hash key information, an arrangement order of parameter items of the first hash key information, and a manner of obtaining a first hash value. The second hash algorithm information includes at least one of the following: a second hash algorithm, a parameter item of second hash key information, an arrangement order of parameter items of the second hash key information, or a manner of obtaining a second hash value. In this way, the solution is more compatible with the conventional technology.

To improve flexibility of the solution, in a possible implementation, when the first hash algorithm information is different from the second hash algorithm information, the first hash algorithm information and the second hash algorithm information meet at least one of the following: The first hash algorithm is different from the second hash algorithm: the parameter item of the first hash key information is different from the parameter item of the second hash key information: the arrangement order of parameter items of the first hash key information is different from the arrangement order of parameter items of the second hash key information: or the manner of obtaining the first hash value is different from the manner of obtaining the second hash value.

This application is applicable to a plurality of load balancing technologies. For example, the first quantity may include a quantity of equal-cost multi-path group (ECMP group) members of the first communication device. In this case, the first hash algorithm information is also applicable to a process of performing load balancing based on an ECMP technology. For another example, the first quantity may include a quantity of link aggregation group (LAG group) members of the first communication device. In this case, the first hash algorithm information is also applicable to a process of performing load balancing based on a LAG technology.

In a possible implementation, the load balancing device may further receive a second message, where the second message includes third hash algorithm information of the load balancing mode of the first communication device and information about a third quantity of third ports of the first communication device. The load balancing device may determine the second hash algorithm information of the load balancing mode of the second communication device based on the first message and the second message. The first communication device may perform load balancing once, or may perform load balancing for a plurality of times, and one or more of the plurality of times of load balancing may affect diversity of packets received by the second communication device. Therefore, the load balancing device can determine more proper second hash algorithm information if the first communication device can send all hash algorithm information of the plurality of times of load balancing to the load balancing device.

In a possible implementation, the first quantity includes the quantity of equal-cost multi-path group (ECMP group) members of the first communication device, and the third quantity includes the quantity of link aggregation group (LAG group) members of the first communication device. In this way, the solution is more compatible with the conventional technology.

In a possible implementation, the load balancing device may determine the second hash algorithm information of the load balancing mode of the second communication device based on the first message, the second message, and the information about the second quantity of second ports of the second communication device. In a process of performing load balancing on a packet, the second communication device needs to perform a modulo operation on the second quantity by using a hash value calculated based on the second hash algorithm information, to determine, based on a hash modulus value obtained, an egress port corresponding to the packet. In other words, the second quantity affects allocation of packets of the second communication device to the ports. Therefore, the second hash algorithm information can be more properly determined with reference to the quantity of ports of the second communication device.

In a possible implementation, the second hash algorithm information meets a first condition, and the first condition includes: Two hash modulus values obtained by separately performing a modulo operation on the second quantity of second ports of the second communication device by using two hash values are different, where the two hash values are obtained by separately performing hash calculation on a first packet and a second packet based on the second hash algorithm information. In this way, the received first packet and the received second packet may be sent through two different ports corresponding to the two different hash modulus values, thereby alleviating network polarization.

In a possible implementation, the first condition further includes: Two hash modulus values obtained by separately performing a modulo operation on the first quantity by using two hash values are the same, where the two hash values are obtained by separately performing hash calculation on the first packet and the second packet based on the first hash algorithm information. In this way, the first packet and the second packet may be sent to the second communication device after two different upper-level devices or a same upper-level device (including the first communication device and another communication device) of the second communication device perform/performs load balancing on the first packet and the second packet based on the first hash algorithm information and the first quantity. Further, the first packet and the second packet that meet the first condition may be sent through different links after load balancing is performed on the first packet and the second packet based on the second hash algorithm information, thereby alleviating polarization.

In a possible implementation, the first condition further includes: Two hash modulus values obtained by separately performing a modulo operation on the third quantity by using two hash values obtained by separately performing hash calculation on the first packet and the second packet based on the third hash algorithm information are connected to the second communication device through a port corresponding to the first communication device. The third hash algorithm information is hash algorithm information corresponding to the load balancing mode of the first communication device, and the third quantity includes a quantity of third ports of the first communication device. In this way, both the first packet and the second packet are sent to the second communication device after an upper-level device of the second communication device performs load balancing on the first packet and the second packet based on the first hash algorithm information, the first quantity, the third hash algorithm information, and the third quantity. Further, the first packet and the second packet that meet the first condition may be sent through different links after load balancing is performed on the first packet and the second packet based on the second hash algorithm information, thereby alleviating polarization.

In another possible implementation, the load balancing device may pre-establish a hash algorithm information association relationship, and the hash algorithm information association relationship may be stored in a table or a document in another form. The hash algorithm information association relationship includes an association relationship among the first hash algorithm information, the information about the first quantity, the information about the second quantity of second ports of the second communication device, and the second hash algorithm information. In this way, the load balancing device may query a preset hash algorithm information association relationship based on the first hash algorithm information and the information about the first quantity, to obtain the second hash algorithm information.

In a possible implementation, the hash algorithm information association relationship further includes an association relationship among the first hash algorithm information, the information about the first quantity, the third hash algorithm information, the information about the third quantity, information about a hash modulus value corresponding to a port that is of the first communication device and that is connected to the second communication device, the information about the second quantity of second ports of the second communication device, and the second hash algorithm information. In this way, second hash algorithm information that is more proper and has a less diversity loss may be found from the hash algorithm information association relationship based on a plurality of pieces of hash algorithm information of the first communication device.

In a possible implementation, the load balancing device may determine a fourth quantity corresponding to hash algorithm information in N pieces of hash algorithm information, where N is a positive integer: and select, from the N pieces of hash algorithm information, hash algorithm information whose corresponding fourth quantity is greater than 1 as the second hash algorithm information. For the hash algorithm information in the N pieces of hash algorithm information, the fourth quantity corresponding to the hash algorithm information is a deduplicated quantity of M hash modulus values obtained by separately performing a modulo operation on the second quantity of second ports of the second communication device by using M hash values, where the M hash values are obtained by separately performing hash calculation on M packets based on the hash algorithm information, and M is an integer greater than 1. In this way, the M packets may be allocated to at least two links after load balancing is performed on the M packets based on the second hash algorithm information and the second quantity, thereby alleviating network polarization.

In a possible implementation, the load balancing device may select, from the N pieces of hash algorithm information, hash algorithm information whose corresponding fourth quantity is largest as the second hash algorithm information. In this way, if the hash algorithm information whose fourth quantity is largest is selected as the second hash algorithm information, the M packets can be allocated to more links as much as possible for transmission, thereby alleviating network polarization as much as possible.

In a possible implementation, the M packets meet a second condition, and the second condition includes: M hash modulus values obtained by separately performing a modulo operation on the first quantity by using M hash values are the same, where the M hash values are obtained by separately performing hash calculation on the M packets based on the first hash algorithm information. In this way, if receiving the M packets, another communication device sends the M packets to the second communication device after load balancing is performed on the M packets based on the first hash algorithm information and the first quantity. In this way, the M packets that meet the second condition may be sent through different links after load balancing is performed on the M packets based on the second hash algorithm information, thereby alleviating polarization.

In a possible implementation, the second condition further includes: M hash modulus values obtained by separately performing a modulo operation on the third quantity by using M hash values obtained by separately performing hash calculation on the M packets based on the third hash algorithm information are connected to the second communication device through a layer-2 physical port corresponding to the first communication device. The third hash algorithm information is hash algorithm information corresponding to the load balancing mode of the first communication device, and the third quantity includes a quantity of third ports of the first communication device.

In this way, both the first packet and the second packet are sent to the second communication device after an upper-level device of the second communication device performs load balancing on the first packet and the second packet based on the first hash algorithm information, the first quantity: the third hash algorithm information, and the third quantity. Further, the first packet and the second packet that meet the first condition may be sent through different links after load balancing is performed on the first packet and the second packet based on the second hash algorithm information, thereby alleviating polarization.

In a possible implementation, after the load balancing device receives the first message, the method further includes: determining that the second hash algorithm information meeting the first condition does not exist, and determining fourth hash algorithm information of the load balancing mode of the second communication device: and sending a third message to the first communication device, where the third message indicates the first communication device to update, based on the fourth hash algorithm information and the information about the second quantity of second ports of the second communication device, the hash algorithm information corresponding to the load balancing mode of the first communication device.

In this way, a hash algorithm may be reselected for the first communication device, to alleviate network polarization. For a solution of selecting the hash algorithm and another parameter in the hash algorithm information for the first communication device, refer to the foregoing method for selecting the second hash algorithm information for the second communication device. Details are not described herein again.

In a possible implementation, after the load balancing device receives the first message, the method further includes: determining that the second hash algorithm information meeting the first condition does not exist, and determining fourth hash algorithm information of the load balancing mode of the second communication device. The load balancing device determines fifth hash algorithm information of the load balancing mode of the first communication device based on the fourth hash algorithm information, the information about the first quantity, and the information about the second quantity of second ports of the second communication device. The load balancing device sends a fourth message to the first communication device, where the fourth message is used to indicate the first communication device to forward the packet based on the fifth hash algorithm information.

In this way, the load balancing device may reselect a hash algorithm for the first communication device, to alleviate network polarization. For a solution of selecting the hash algorithm and another parameter in the hash algorithm information for the first communication device, refer to the foregoing method for selecting the second hash algorithm information for the second communication device. Details are not described herein again.

In a possible implementation, the fourth hash algorithm information meets the following condition: Two hash modulus values obtained by separately performing a modulo operation on the second quantity by using two hash values obtained by separately performing hash calculation on a third packet and a fourth packet based on the fourth hash algorithm information are different. In this way, the third packet and the fourth packet may be sent on the second communication device through two links, thereby alleviating network polarization.

In a possible implementation, the third packet and the fourth packet meet the following condition: Two hash modulus values obtained by separately performing a modulo operation on the first quantity by using two hash values are the same, where the two hash values are obtained by separately performing hash calculation on the third packet and the fourth packet based on the fifth hash algorithm information. In this way, an upper-level device of the second communication device may send the third packet and the fourth packet to the second communication device after performing load balancing on the third packet and the fourth packet based on the fifth hash algorithm information and the first quantity. Further, the third packet and the fourth packet may be sent on the second communication device through two links, thereby alleviating network polarization.

In a possible implementation, before the load balancing device determines the second hash algorithm information of the load balancing mode of the second communication device based on the first hash algorithm information and the information about the first quantity. the method further includes: determining that the second communication device is a secondary device. After the load balancing device receives the first hash algorithm information of the load balancing mode of the first communication device and the information about the first quantity of ports of the first communication device, the method further includes: determining that the second hash algorithm information meeting the first condition does not exist, and updating the second communication device as a primary device. In this way, hash algorithm information may be reselected for the first communication device based on new hash algorithm information determined for the second communication device, thereby alleviating network polarization.

In a possible implementation, at least one of the first hash algorithm information or the information about the first quantity is carried in the following information: a link layer discovery protocol LLDP message, an open shortest path first protocol OSPF message, or a border gateway protocol BGP message. In this way, the solution is more compatible with the conventional technology.

According to a second aspect, a communication apparatus is provided. The communication apparatus may be the foregoing load balancing device, and the communication apparatus may include a communication unit and a processing unit, to perform any one of the first aspect or the implementations of the first aspect. The communication unit is configured to perform functions related to sending and receiving. Optionally, the communication unit includes a receiving unit and a sending unit. In a design, the communication apparatus is a communication chip, the processing unit may be one or more processors or processor cores, and the communication unit may be an input/output circuit or a port of the communication chip.

In another design, the communication unit may be a transmitter and a receiver, or the communication unit may be a transmitting machine and a receiving machine.

Optionally, the communication apparatus further includes modules that can be configured to perform any one of the first aspect or the implementations of the first aspect.

According to a third aspect, a communication apparatus is provided. The communication apparatus may be the foregoing load balancing device, and the communication apparatus may include a processor and a memory. Optionally, the communication apparatus further includes a transceiver. The memory is configured to store a computer program or instructions. The processor is configured to invoke the computer program or the instructions from the memory and run the computer program or the instructions. When the processor executes the computer program or the instructions in the memory, the communication apparatus is enabled to perform any one of the first aspect or the implementations of the first aspect.

Optionally, there are one or more processors, and there are one or more memories.

Optionally, the memory may be integrated with the processor, or the memory is disposed separately from the processor.

Optionally, the transceiver may include a transmitting machine (transmitter) and a receiving machine (receiver).

According to a fourth aspect, a communication apparatus is provided. The communication apparatus may be the foregoing load balancing device, and the communication apparatus may include a processor. The processor is coupled to a memory, and can be configured to perform any one of the first aspect or the implementations of the first aspect. Optionally, the communication apparatus further includes the memory. Optionally, the communication apparatus further includes a communication interface, and the processor is coupled to the communication interface.

In an implementation, when the communication apparatus is the load balancing device, the communication interface may be a transceiver or an input/output interface. Optionally, the transceiver may be a transceiver circuit. Optionally, the input/output interface may be an input/output circuit.

In another implementation, when the communication apparatus is a chip or a chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to a fifth aspect, a system is provided. The system includes the foregoing communication apparatus, the foregoing first communication device, and the foregoing second communication device.

According to a sixth aspect, a computer program product is provided. The computer program product includes a computer program (which may also be referred to as code or instructions). When the computer program is run, a computer is enabled to perform any one of the first aspect or the implementations of the first aspect.

According to a seventh aspect, a computer-readable storage medium is provided. The computer-readable medium stores a computer program (which may also be referred to as code or instructions). When the computer program runs on a computer, the computer is enabled to perform any one of the first aspect or the implementations of the first aspect.

According to an eighth aspect, a chip system is provided. The chip system may include a processor. The processor is coupled to a memory, and can be configured to perform any one of the first aspect or the implementations of the first aspect. Optionally, the chip system further includes the memory. The memory is configured to store a computer program (which may also be referred to as code or instructions). The processor is configured to invoke the computer program from the memory and run the computer program, to enable a device on which a chip system is installed to perform any one of the first aspect or the implementations of the first aspect.

According to a ninth aspect, a processing apparatus is provided, including an interface circuit and a processing circuit. The interface circuit may include an input circuit and an output circuit. The processing circuit is configured to receive a signal through the input circuit, and transmit a signal through the output circuit, to enable any one of the first aspect or the implementations of the first aspect to be implemented.

In a specific implementation process, the processing apparatus may be a chip, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and various circuits are not limited in this application.

In an implementation, the communication apparatus may be some components, for example, an integrated circuit product such as a system chip or a communication chip, in the load balancing device. The interface circuit may be an input/output interface, an interface circuit, an output circuit, an input circuit, a pin, a related circuit, or the like on the chip or the chip system. The processing circuit may be a logic circuit on the chip.

BRIEF DESCRIPTION OF DRAWINGS

FIG. 6 is a schematic flowchart of another method for determining hash algorithm information for load balancing according to an embodiment of this application;

FIG. 8A is a schematic diagram of a structure of an extended LLDP message used to carry first hash algorithm information and information about a first quantity according to an embodiment of this application;

FIG. 8B is a schematic diagram of a structure of another OSPF message used to carry first hash algorithm information and information about a first quantity according to an embodiment of this application;

FIG. 8C is a schematic diagram of a structure of another BGP message used to carry first hash algorithm information and information about a first quantity according to an embodiment of this application;

FIG. 9 is a schematic diagram of a structure of a communication apparatus according to an embodiment of this application;

DESCRIPTION OF EMBODIMENTS

It should be understood that the technical solutions in embodiments of this application may be applied to various communication systems, for example, communication systems, such as an internal server access switch of a data center and an interconnection between switches that are included in a data center network, a cross-metro interconnection or backbone network of an operator, a mobile bearer fronthaul or backhaul field, a metropolitan multi-service bearer, a data center interconnection, and industrial communication, that are based on an Ethernet technology, and a communication system between different components or modules in an industrial or communication device.

Figure 1A:
FIG. 1A, FIG. 1B, FIG. 1C, and FIG. 1D are schematic diagrams of several system architectures to which embodiments of this application are applicable.

FIG. 1A, FIG. 1B, FIG. 1C, and FIG. 1D are schematic diagrams of examples of several system architectures to which embodiments of this application are applicable. As shown in FIG. 1A, the system architecture includes a first communication device and a load balancing device. The load balancing device may be connected to the first communication device, and is configured to receive first hash algorithm information used by the first communication device for load balancing and information about a quantity of first ports of the first communication device (where for differentiation, the quantity of first ports is referred to as a first quantity). The load balancing device selects second hash algorithm information for a second communication device based on the first hash algorithm information and the information about the first quantity. In this embodiment of this application, the information about the first quantity is information that can indicate the first quantity.

As shown in FIG. 1A, the system architecture may further include the second communication device, and the second communication device may send a packet based on the second hash algorithm information selected by the load balancing device for the second communication device. The first communication device may be an upstream of the second communication device. The first communication device sends the packet to the second communication device, and then the second communication device sends the packet to another device. Alternatively, the first communication device may be a downstream of the second communication device. The second communication device sends the packet to the first communication device, and then the first communication device sends the packet to another device. To describe the solutions provided in embodiments of this application more clearly in subsequent content, an example in which the first communication device is an upstream of the second communication device is used for description in the subsequent content.

The first communication device and the second communication device in embodiments of this application may be network devices, or may be chips disposed inside a network device. The device includes but is not limited to: a data center switch, an operator metropolitan area network router, a campus switch, an artificial intelligence (AI) and high-performance computing network switch, a core router, an internet protocol-radio access network (IPRAN), a packet transport network (PTN) box-shaped or frame-shaped switch device, and the like.

Figure 1B:
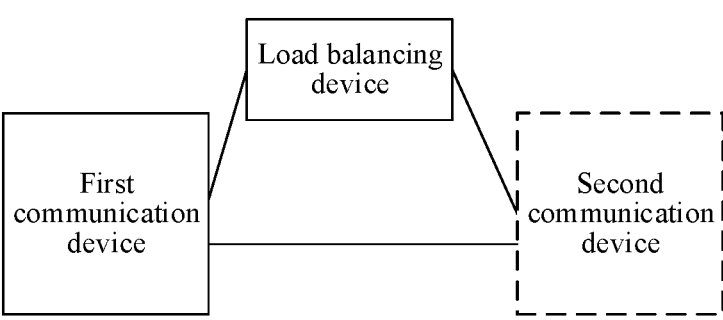

There are a plurality of relationships between the load balancing device and the second communication device in embodiments of this application. As shown in FIG. 1A, the load balancing device may be a module or a unit in the second communication device. As shown in FIG. 1B, the load balancing device may alternatively be a device independent of the first communication device and the second communication device.

Figure 1C:
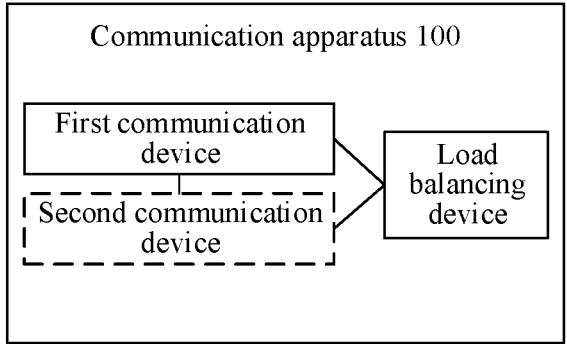
Figure 1D:
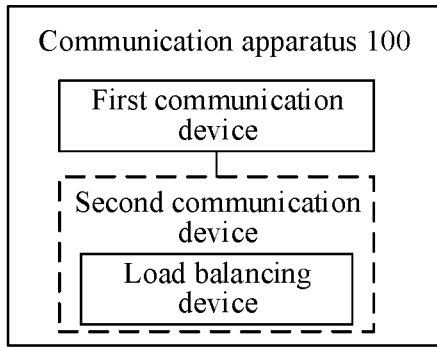

In embodiments of this application, the first communication device and the second communication device may be different devices, as shown in FIG. 1A and FIG. 1B. In another possible implementation, as shown in FIG. 1C and FIG. 1D, the first communication device and the second communication device may alternatively be in a same communication apparatus 100. For example, the first communication device may be a layer-3 (Layer 3, L3) communication module in the communication apparatus 100, and the second communication device may be a layer-2 (Layer 2, L2) communication module in the communication apparatus 100. The first communication device may select a next hop for the packet at a layer 3 based on the first hash algorithm information, and the second communication device may select a layer 2 port for the packet at a layer 2 based on the second hash algorithm information. For another example, the first communication device may be a layer-2 communication module in the communication apparatus 100, and the second communication device may be a layer-3 communication module in the communication apparatus 100. The second communication device may select a next hop for the packet at a layer 3 based on the second hash algorithm information, and the first communication device may select a layer-2 port for the packet at a layer 2 based on the first hash algorithm information. In FIG. 1C and FIG. 1D, related content of the embodiments is described in detail subsequently, and is not described herein. To describe the solutions provided in embodiments of this application more clearly in subsequent content, an example in which the first communication device may be a layer-3 communication module in the communication apparatus 100 and the second communication device may be a layer-2 communication module in the communication apparatus 100 is used for description in the subsequent content.

In addition, the load balancing device in FIG. 1C may be a module independent of the first communication device and the second communication device, and the load balancing device in FIG. 1D may be a module in the second communication device. Certainly, the load balancing device in FIG. 1C may alternatively be a module on another device other than the communication apparatus 100. This is not limited in embodiments of this application.

Before embodiments of this application are further described, terms and nouns in embodiments of this application are first explained.

(1) Technology Used in a Load Balancing Mode

The first hash algorithm information of the first communication apparatus in embodiments of this application is applicable to a plurality of scenarios. For example, the first communication device may select a next hop for the packet based on the first hash algorithm information, for example, may select a next hop for the packet based on an equal-cost multi-path (ECMP) routing technology. That the first communication device selects a next hop for the packet may also be understood as that the first communication device selects a logical port for the packet, for example, selects a logical port for the packet at a layer 3. The logical port in embodiments of this application may also be referred to as a logical egress port.

For another example, the first communication device may select a physical port for the packet based on the first hash algorithm information. For example, the first communication device may select a physical port for the packet at a layer 2; for example, the first communication device may select a physical port for the packet based on a link aggregation (LAG) technology, where LAG may also be referred to as a port trunk (trunk) technology. The physical port may also be referred to as a physical egress port.

(2) ECMP

An example in which the first communication device performs load balancing based on the first hash algorithm information by using an ECMP technology is used below for description. For differentiation, a hash algorithm included in the first hash algorithm information is referred to as a first hash algorithm, hash key information in the first hash algorithm information is referred to as first hash key information, and a manner of obtaining a hash value in the first hash algorithm information is referred to as a manner of obtaining a first hash value.

The first communication device receives a first packet, obtains a layer-3 network layer identifier (that is, a destination internet protocol (IP) address (destination IP address, DIP) or the like) of the first packet, and queries a network layer routing table.

When determining, based on the network layer routing table, that there are a plurality of paths to the destination IP of the first packet (that is, there are a plurality of equal-cost next hops on the paths to the destination IP), the first communication device performs the following content:

The first communication device extracts, from the first packet based on a preset parameter item of the first hash key information, information corresponding to the parameter item of the first hash key information.

The first communication device sequentially arranges extracted information about parameter items of the first hash key information based on a preset arrangement order of parameter items of the first hash key information, to form the first hash key information (hash key). (It should be noted that if information about some parameter items is not extracted, a preset value may be filled in a corresponding field of the first hash key information according to a preset rule.)

The first communication device performs hash calculation on the first hash key information based on the first hash algorithm, and determines, based on the manner of obtaining the first hash value, a hash value from obtained values.

The first communication device performs a modulo operation on the first quantity of first ports of the first communication device based on the obtained hash value, to obtain a hash modulus value of the first packet. It should be noted that the first quantity of first ports of the first communication device may be understood as a quantity of ECMP group (Group) members that correspond to the first packet and that are on the first communication device in this example, may be understood as a total quantity of paths to the destination IP of the first packet, may be understood as a total quantity of paths to an IP subnet of the destination IP of the first packet, or may be understood as a quantity of next hops to a subnet in which the destination IP of the first packet is located.

Further, the first communication device determines, based on a preset correspondence between a hash modulus value and a next-hop communication device (or referred to as a preset correspondence between a hash modulus value and a preset logical egress port), next-hop information corresponding to the hash modulus value of the first packet (for example, determines that the next hop is to the second communication device). In this case, the first communication device sends the first packet to the next hop (for example, the second communication device). That the first communication device determines the next hop may also be understood as determining the logical egress port, and the first communication device may send the packet through the logical egress port.

The foregoing content is described below by using an example in which the first communication device performs load balancing based on the first hash algorithm information by using the ECMP technology. A solution in which another communication device performs load balancing based on another piece of hash algorithm information by using the ECMP technology is similar thereto, but hash algorithm information and a quantity of ECMP group members that may be used are different. Details are not described herein again.

(3) LAG

An example in which the first communication device performs load balancing based on the first hash algorithm information by using a LAG technology is used below for description. For differentiation, a hash algorithm included in the first hash algorithm information is referred to as a first hash algorithm, hash key information in the first hash algorithm information is referred to as first hash key information, and a manner of obtaining a hash value in the first hash algorithm information is referred to as a manner of obtaining a first hash value.

The first communication device receives a first packet, obtains a layer-2 link layer identifier (that is, a destination medium access control (MAC) address (destination MAC) or the like) of the first packet, and queries a MAC table.

When determining, based on the MAC table, that there are a plurality of ports to the destination MAC of the first packet, the first communication device performs the following content:

The first communication device extracts, from the first packet based on a preset parameter item of the first hash key information, information corresponding to the parameter item of the first hash key information.

The first communication device sequentially arranges extracted information about parameter items of the first hash key information based on a preset arrangement order of parameter items of the first hash key information, to form the first hash key information (hash key). (It should be noted that if information about some parameter items is not extracted, a preset value may be filled in a corresponding field of the first hash key information according to a preset rule.)

The first communication device performs hash calculation on the first hash key information based on the first hash algorithm, and determines, based on the manner of obtaining the first hash value, a hash value from obtained values.

The first communication device performs a modulo operation on the first quantity of first ports of the first communication device by using the obtained hash value, to obtain a hash modulus value of the first packet. It should be noted that, in this example, the first quantity of first ports of the first communication device may be understood as a quantity of LAG group (Group) members that correspond to the first packet and that are on the first communication device, may be understood as a total quantity of ports that correspond to the destination MAC of the first packet and that are on the first communication device, or is understood as a total quantity of paths to the destination MAC of the first packet.

Further, the first communication device determines, based on a correspondence between a preset hash modulus value and a port (which may be understood as a physical egress port), a port corresponding to the hash modulus value of the first packet, and sends the first packet through the port.

The foregoing content is described by using an example in which the first communication device performs load balancing based on the first hash algorithm information by using the LAG technology. A manner in which the first communication device performs load balancing based on third hash algorithm information by using the LAG technology is similar thereto. A difference is that items in the first hash algorithm information are correspondingly replaced with items in the third hash algorithm information, and the first quantity is replaced with a third quantity of third ports of the first communication device. Other content is similar thereto, and details are not described herein again. In addition, a solution in which load balancing is performed by using another piece of hash algorithm information by using the LAG technology is similar thereto, but hash algorithm information and a quantity of LAG group members that may be used are different. Details are not described herein again.

Figure 2A:
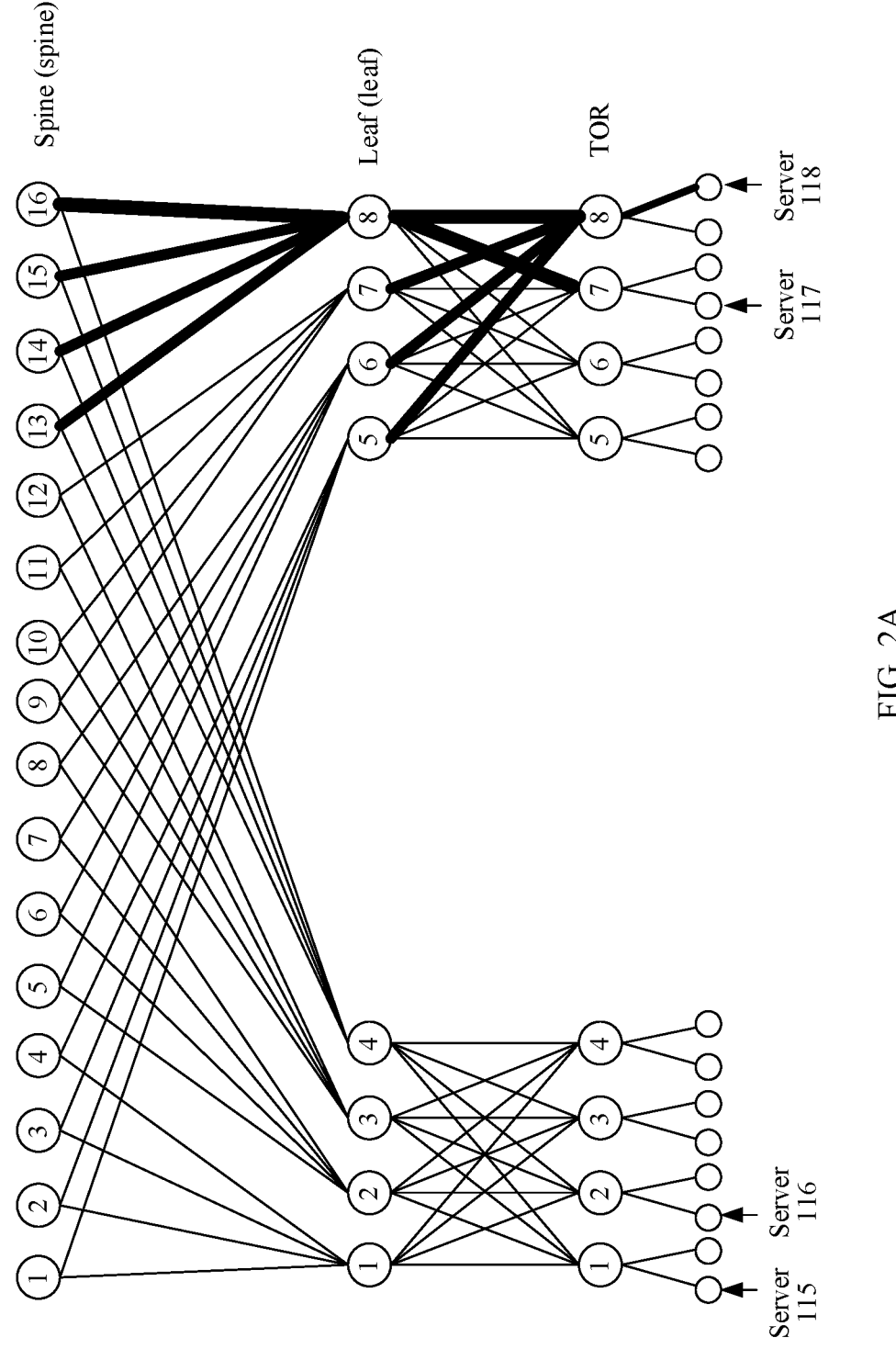
FIG. 2A, FIG. 2B, FIG. 2C, and FIG. 2D are schematic diagrams of several system architectures according to embodiments of this application.

FIG. 2A is an example of a schematic diagram of a system architecture according to an embodiment of this application. As shown in FIG. 2A, this embodiment of this application is applicable to a three-level CLOS (CLOS) network architecture. The network architecture includes TOR/leaf/spine three-level networking, and each level may include a plurality of communication devices (where the communication devices may be switches). As shown in FIG. 2A, a TOR level includes eight communication devices that are respectively identified by 1 to 8 in FIG. 2A, a leaf level includes eight communication devices that are respectively identified by 1 to 8 in FIG. 2A, and a spine level includes 16 communication devices that are respectively identified by 1 to 16 in FIG. 2A. A TOR-level communication device may be connected to one or more servers, for example, a server 118 connected to a TOR-level communication device 8, a server 117 connected to a TOR-level communication device 7, a server 116 connected to a TOR-level communication device 2, and a server 115 connected to a TOR-level communication device 1.

In the system architecture shown in FIG. 2A, there may be usually two times of traffic load balancing. One is in a forwarding direction from a communication device of a TOR to a communication device of a leaf, and the other is in a forwarding direction from a communication device of a leaf to a communication device of a spine. For example, the TOR-level communication device 8 is connected to leaf-level communication devices by using four links, and is configured to send a packet of the TOR-level communication device 8 to the leaf level by using the four links. For example, the TOR-level communication device 8 may send the packet by using the foregoing ECMP technology. The leaf-level communication device 8 is connected to spine-level communication devices by using four links, and is configured to send a packet of the leaf-level communication device 8 to the spine-level by using the four links. For example, the leaf-level communication device 8 may send the packet by using the foregoing ECMP technology.

The first communication device in FIG. 1A and FIG. 1B may be a TOR-level communication device in FIG. 2A, and the second communication device may be a leaf-level communication device in FIG. 2A; or the first communication device is a leaf-level communication device in FIG. 2A, and the second communication device is a TOR-level communication device in FIG. 2A. The load balancing device may be a module inside the second communication device, or may be a device or module independent of the TOR-level communication device and the leaf-level communication device.

For example, after receiving a first packet and a second packet, the TOR-level communication device 8 calculates, based on hash algorithm information and a quantity of ports of the TOR-level communication device 8, that a hash modulus value of the first packet is the same as a hash modulus value of the second packet, and sends the first packet and the second packet to a same leaf-level communication device, for example, the leaf-level communication device 8. The first packet and the second packet may come from a same server, or may come from different servers.

Further, after receiving the first packet and the second packet, the leaf-level communication device 8 calculates, based on hash algorithm information and a quantity of ports of the leaf-level communication device 8, hash modulus values corresponding to the two packets. Because the hash modulus values of the two packets calculated by the TOR-level communication device 8 based on the hash algorithm information and the quantity of ports of the TOR-level communication device 8 are the same, the hash modulus values of the two packets calculated by the leaf-level communication device 8 based on the hash algorithm information and the quantity of ports of the leaf-level communication device 8 are also the same. In this way, for a plurality of packets that are received at the leaf level and that are from the TOR-level communication device 8, the leaf-level communication device 8 sends the plurality of packets through only one link, and cannot balance the plurality of packets to a plurality of links for sending.

On the other hand, the leaf-level communication device 8 also receives one or more packets, for example, a third packet and a fourth packet, from another TOR-level communication device (the TOR-level communication device 7). Similarly, because the TOR-level communication device 7 sends the two packets to the leaf-level communication device 8 based on hash algorithm information and a quantity of ports of the TOR-level communication device 7 and based on a calculated hash modulus value of the third packet and a calculated hash modulus value of the fourth packet, a hash modulus value of the third packet and a hash modulus value of the fourth packet that are calculated by the leaf-level communication device 8 based on the hash algorithm information and the quantity of ports of the leaf-level communication device 8 are also the same. When the TOR-level communication device 7 and the TOR-level communication device 8 have the same hash algorithm information and the same quantity of ports, the hash modulus value of the first packet, the hash modulus value of the second packet, the hash modulus value of the third packet, and the hash modulus value of the fourth packet that are calculated by the leaf-level communication device 8 are all the same. Therefore, for a plurality of packets received by the leaf level from different TOR-level communication devices (the TOR-level communication device 7 and the TOR-level communication device 8), the leaf-level communication device 8 sends the four packets through only one link, and cannot balance the plurality of packets to a plurality of links for sending.

Traffic load balancing aims to balance traffic, that is, traffic expected to be forwarded is evenly distributed to a plurality of downstream links. However, if the traffic to be forwarded is not evenly distributed to the plurality of downstream links, load of some links is high and load of some links is low. When a high-load link approaches the full load, a low-load link is idle. Consequently, overall network utilization is low. This phenomenon is referred to as polarization. It can be learned from the foregoing analysis that, to slow down occurrence of a polarization phenomenon, hash algorithm information needs to be more properly set for a device that performs load balancing. This is a problem to be resolved in embodiments of this application.

It should be noted that FIG. 2A is illustrated by using an example in which a layer-3 hash algorithm is performed between communication devices. During actual application, any device that needs to perform load balancing shown in FIG. 2A may perform layer-3 load balancing, or may perform layer-2 load balancing. For example, the TOR-level communication device 8 may have a plurality of links to the leaf-level communication device 8 based on a LAG. For another example, the leaf-level communication device 8 may have a plurality of links to a spine-level communication device 16 based on the LAG. In this case, the TOR-level communication device 8 needs to separately perform load balancing at a layer 3 and a layer 2, and the leaf-level communication device 8 needs to separately perform load balancing at a layer 3 and a layer 2.

Figure 2B:
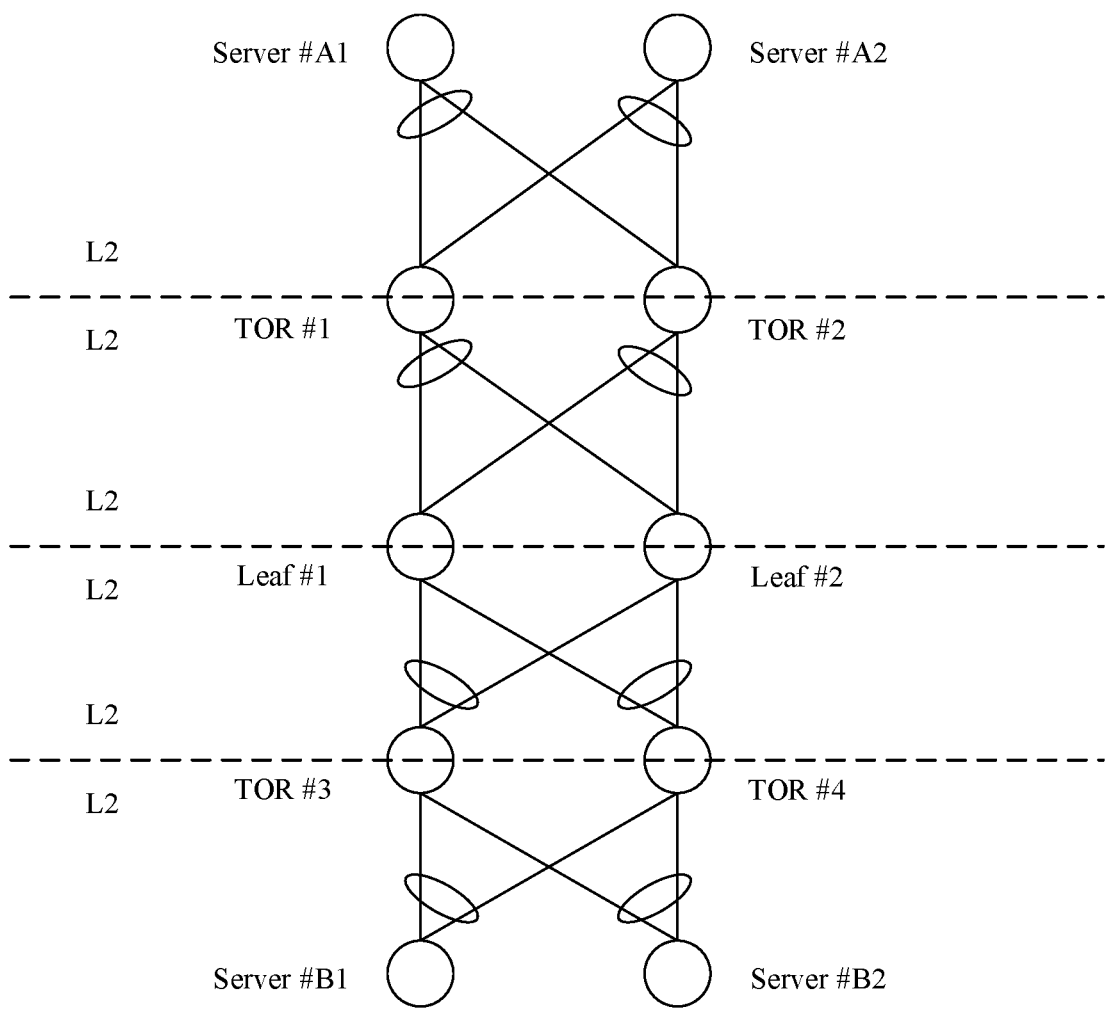

FIG. 2B is an example of a schematic diagram of a system architecture according to an embodiment of this application. As shown in FIG. 2B, this embodiment of this application is applicable to a network architecture in which traffic load balancing is performed by using a link aggregation group (LAG)/port trunk (trunk), and is also applicable to exchange of load balancing information between a server and a switch that use bonding to perform traffic load balancing.

FIG. 2B shows a system architecture of a three-level L2 network. In FIG. 2B, TOR-level communication devices are interconnected by using leaf-level communication devices, and a server #A1 and a server #A2 may access the TOR-level communication devices, for example, a TOR #1 and a TOR #2, in a bond link aggregation mode. The TOR #1 and the TOR #2 are connected to a leaf #1 and a leaf #2 in a back-to-back link aggregation mode. The leaf #1 and the leaf #2 are connected to a TOR #3 and a TOR #4 in a back-to-back link aggregation mode. A server #B1 and a server #B2 are connected to the TOR #3 and the TOR #4 in a bond link aggregation mode.

Figure 2C:
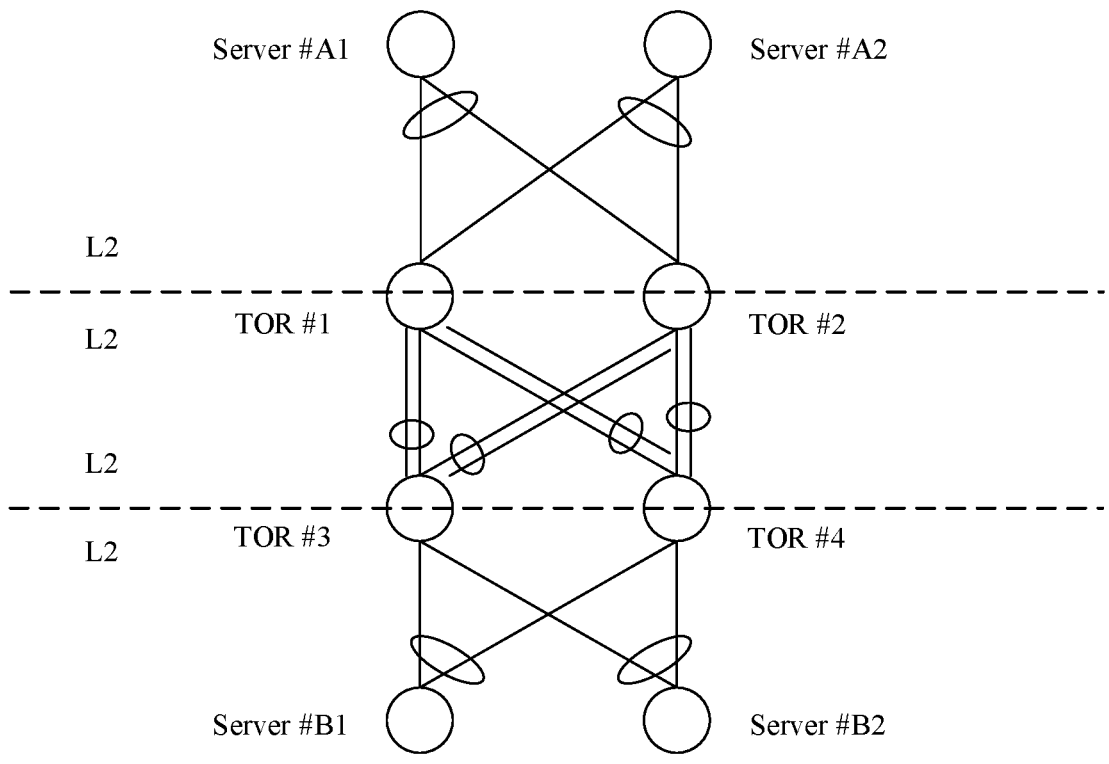

FIG. 2C is an example of a schematic diagram of a system architecture according to an embodiment of this application. A difference from FIG. 2B is that the system architecture shown in FIG. 2C is a system architecture of a two-level L2 network without a leaf-level communication device.

As shown in FIG. 2B, traffic from the server #A1 and the server #A2 to the server #B1 and the server #B2 is first hashed once on the server, and then hashed once on a TOR-level communication device. Because two times of hashing are performed, based on the polarization problem caused by two times of hashing described in FIG. 2A, polarization is also caused if hash algorithm information on a server side and hash algorithm information on a TOR-level communication device side in FIG. 2B are not properly selected.

Still refer to FIG. 2B. If there are a plurality of links from the leaf #1 and the leaf #2 to the TOR #3 and the TOR #4 in a back-to-back manner, traffic from the server #A1 and the server #A2 to the server #B1 and the server #B2 may be first hashed once on TOR-level communication devices (the TOR #1 and the TOR #2), and then hashed once on leaf-level communication devices (the leaf #1 and the leaf #2). Because two times of hashing are performed, based on the polarization problem caused by two times of hashing described in FIG. 2A, polarization is also caused if hash algorithm information on a TOR-level communication device side and hash algorithm information on a leaf-level communication device side are not properly selected.

It should be added that there is another possible case. If there is one link from the leaf #1 and the leaf #2 to the TOR #3 and the TOR #4 in a back-to-back manner, but the leaf #1 and the leaf #2 are dual-homed to the TOR #3 and the TOR #4 based on binding (bonding), the traffic from the server #A1 and the server #A2 to the server #B1 and the server #B2 may be first hashed once on TOR-level communication devices (the TOR #1 and the TOR #2), and then hashed once on leaf-level communication devices (the leaf #1 and the leaf #2). Because two times of hashing are performed, based on the polarization problem caused by two times of hashing described in FIG. 2A, polarization is also caused if hash algorithm information on a TOR-level communication device side and hash algorithm information on a leaf-level communication device side are not properly selected.

As shown in FIG. 2B and FIG. 2C, in still another possible implementation, a server simultaneously accesses two TOR-level communication devices, and the two links may be in an active-standby mode. The server #A1 is used as an example. For a packet sent by the server #A1, a next hop may be first selected at a layer 3 of the server based on an IP address and ECMP (where a hash operation is performed once), and then a port link is selected at a layer 2 of the server #A1 based on a LAG (where the hash operation is performed once again). Because two times of hashing are performed, based on the polarization problem caused by two times of hashing described in FIG. 2A, polarization is also caused if hash algorithm information of the layer 3 and the layer 2 on a server side in FIG. 2B is not properly selected.

As shown in FIG. 2B and FIG. 2C, in another possible implementation, if packets from the server #A1 and the server #A2 arrive at the TOR #1, the TOR #1 may first select a next hop at a layer 3 based on an IP address and ECMP (where a hash operation is performed once), and then select a port link at a layer 2 of the TOR #1 based on a LAG (where the hash operation is performed once again). Because two times of hashing are performed, based on the polarization problem caused by two times of hashing described in FIG. 2A, polarization is also caused if hash algorithm information of the layer 3 and the layer 2 on a TOR #1 side in FIG. 2B is not properly selected. To slow down occurrence of a polarization phenomenon, hash algorithm information needs to be more properly set for a device that performs load balancing. This is a problem to be resolved in embodiments of this application.

It should be noted that the first communication device in FIG. 1A and FIG. 1B may be the server in FIG. 2B, and the second communication device may be the TOR-level communication device in FIG. 2B. Alternatively, the first communication device is the TOR-level communication device in FIG. 2A, and the second communication device is the server in FIG. 2A. The load balancing device may be a module inside the second communication device, or may be a device or module independent of the TOR-level communication device and the server.

Alternatively, the first communication device in FIG. 1A and FIG. 1B may be the TOR-level communication device in FIG. 2B, and the second communication device may be the leaf-level communication device in FIG. 2B. Alternatively, the first communication device is the leaf-level communication device in FIG. 2A, and the second communication device is the TOR-level communication device in FIG. 2A. The load balancing device may be a module inside the second communication device, or may be a device or module independent of the TOR-level communication device and the leaf-level communication device.

The first communication device and the second communication device in FIG. 1C and FIG. 1D may be modules in the server in FIG. 2B. For example, the first communication device may be a layer-3 module in the server, and the second communication device may be a layer-2 module in the server. Alternatively, the first communication device may be a layer-2 module in the server, and the second communication device may be a layer-3 module in the server. The load balancing device may be a module inside the server, or may be a device or module independent of the server.

In still another possible implementation, the first communication device and the second communication device in FIG. 1C and FIG. 1D may be modules in the TOR-level communication device in FIG. 2B. For example, the first communication device may be a layer-3 module in the TOR-level communication device, and the second communication device may be a layer-2 module in the TOR-level communication device. Alternatively, the first communication device may be a layer-2 module in the TOR-level communication device, and the second communication device may be a layer-3 module in the TOR-level communication device. The load balancing device may be a module inside the TOR-level communication device, or may be a device or module independent of the TOR-level communication device.

In yet another possible implementation, the first communication device and the second communication device in FIG. 1C and FIG. 1D may be modules in the leaf-level communication device in FIG. 2B. For example, the first communication device may be a layer-3 module in the leaf-level communication device, and the second communication device may be a layer-2 module in the leaf-level communication device. Alternatively, the first communication device may be a layer-2 module in the leaf-level communication device, and the second communication device may be a layer-3 module in the leaf-level communication device. The load balancing device may be a module inside the leaf-level communication device, or may be a device or module independent of the leaf-level communication device.

Figure 2D:
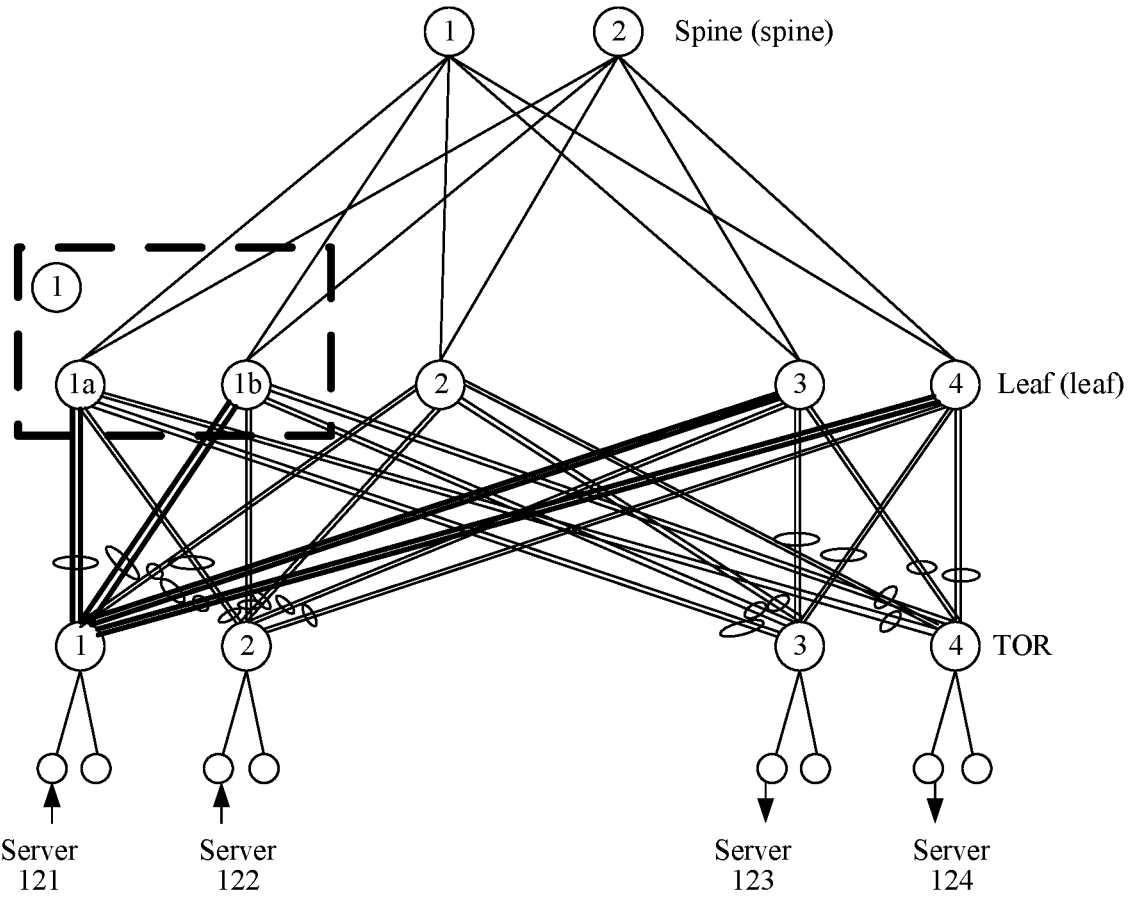

FIG. 2D is an example of a schematic diagram of a system architecture according to an embodiment of this application. As shown in FIG. 2D, this embodiment of this application is applicable to a three-level CLOS (CLOS) network architecture. The network architecture includes TOR/leaf/spine three-level networking, and each level may include a plurality of communication devices (where the communication devices may be switches). As shown in FIG. 2D, a TOR level includes four communication devices that are respectively identified by 1 to 4 in FIG. 2D, and a leaf level includes four logical communication devices that are respectively a leaf-level communication device 1, a leaf-level communication device 2, a leaf-level communication device 3, and a leaf-level communication device 4. The leaf-level communication device 1 may include a plurality of physical leaf-level communication devices.

For example, in FIG. 2D, a leaf-level communication device 1a and a leaf-level communication device 1b are bound to obtain one logical leaf-level communication device 1. A spine level includes two communication devices that are respectively represented as 1 and 2 in the figure. A TOR-level communication device may be connected to one or more servers, for example, a server 121, a server 122, a server 123, and a server 124 shown in FIG. 2D.

Similar to that in FIG. 2A, in FIG. 2D, because hashing is performed at least twice on the TOR-level communication device and the leaf-level communication device, polarization is also caused if hash algorithm information of the leaf-level communication device in FIG. 2D is not properly selected.

In addition, any communication device in embodiments of this application may perform traffic load balancing once, or may perform load balancing for a plurality of times. For example, load balancing is performed once at a layer 3 of the TOR-level communication device, and load balancing is performed once at a layer 2 of the TOR-level communication device. For another example, load balancing is performed once at a layer 3 of the leaf-level communication device, and load balancing is performed once at a layer 2 of the leaf-level communication device.

With reference to FIG. 2D, the following provides a description by using an example in which the TOR-level communication device respectively performs load balancing twice at the layer 3 and the layer 2. After receiving the first packet, the TOR-level communication device 1 calculates a hash modulus value of a first packet based on layer-3 hash algorithm information and a quantity of ECMP group members corresponding to a destination IP address of the first packet, and determines, based on the hash modulus value and a preset correspondence between a hash modulus value and a next hop (or referred to as a logical port), a next hop corresponding to the first packet. Further, the hash modulus value of the first packet is calculated based on layer-2 hash algorithm information and a quantity of LAG members corresponding to a destination MAC of the first packet, a physical port corresponding to the first packet is determined based on the hash modulus value and a preset correspondence between a hash modulus value and a physical port, and the first packet is sent to a next hop corresponding to the first packet through the physical port. As shown in FIG. 2D, there are four links in total from the TOR-level communication device to the leaf-level communication device 1, where two links are connected to the leaf-level communication device 1a, and the other two links are connected to the leaf-level communication device 1b. The TOR-level communication device may select a transmission link for the first packet from the four links connected to the leaf-level communication device 1 based on a LAG technology.

It should be noted that, in FIG. 2D, because one leaf-level communication device may be formed by binding a plurality of devices, a hash algorithm selected by the leaf-level communication device may be affected by layer-3 hash algorithm information of the TOR-level communication device on the one hand, and may be further affected by layer-2 hash algorithm information of the TOR-level communication device (for example, a diversity quantity of packets received by the leaf-level communication device 1a is affected, and this example is described in detail in a subsequent embodiment, and is not described herein) on the other hand. It may also be understood that load balancing may be performed on the first communication device for a plurality of times, and the plurality of times of load balancing may affect selection of a hash algorithm of the second communication device. Therefore, this embodiment of this application further provides a possible implementation, that is, the second communication device may determine hash algorithm information of the second communication device with reference to hash algorithm information of the first communication device for at least two times of load balancing.

For differentiation, in this embodiment of this application, layer-3 hash algorithm information for load balancing performed by the first communication device is referred to as first hash algorithm information, and layer-2 hash algorithm information for the load balancing performed by the first communication device is referred to as third hash algorithm information. Content in this solution is described in detail subsequently, and is not described herein.

The first communication device in FIG. 1A and FIG. 1B may be the TOR-level communication device in FIG. 2D, and the second communication device may be the leaf-level communication device in FIG. 2D; or the first communication device is the leaf-level communication device in FIG. 2D, and the second communication device is the TOR-level communication device in FIG. 2D. The load balancing device may be a module inside the second communication device, or may be a device or module independent of the TOR-level communication device and the leaf-level communication device.

Figure 3:
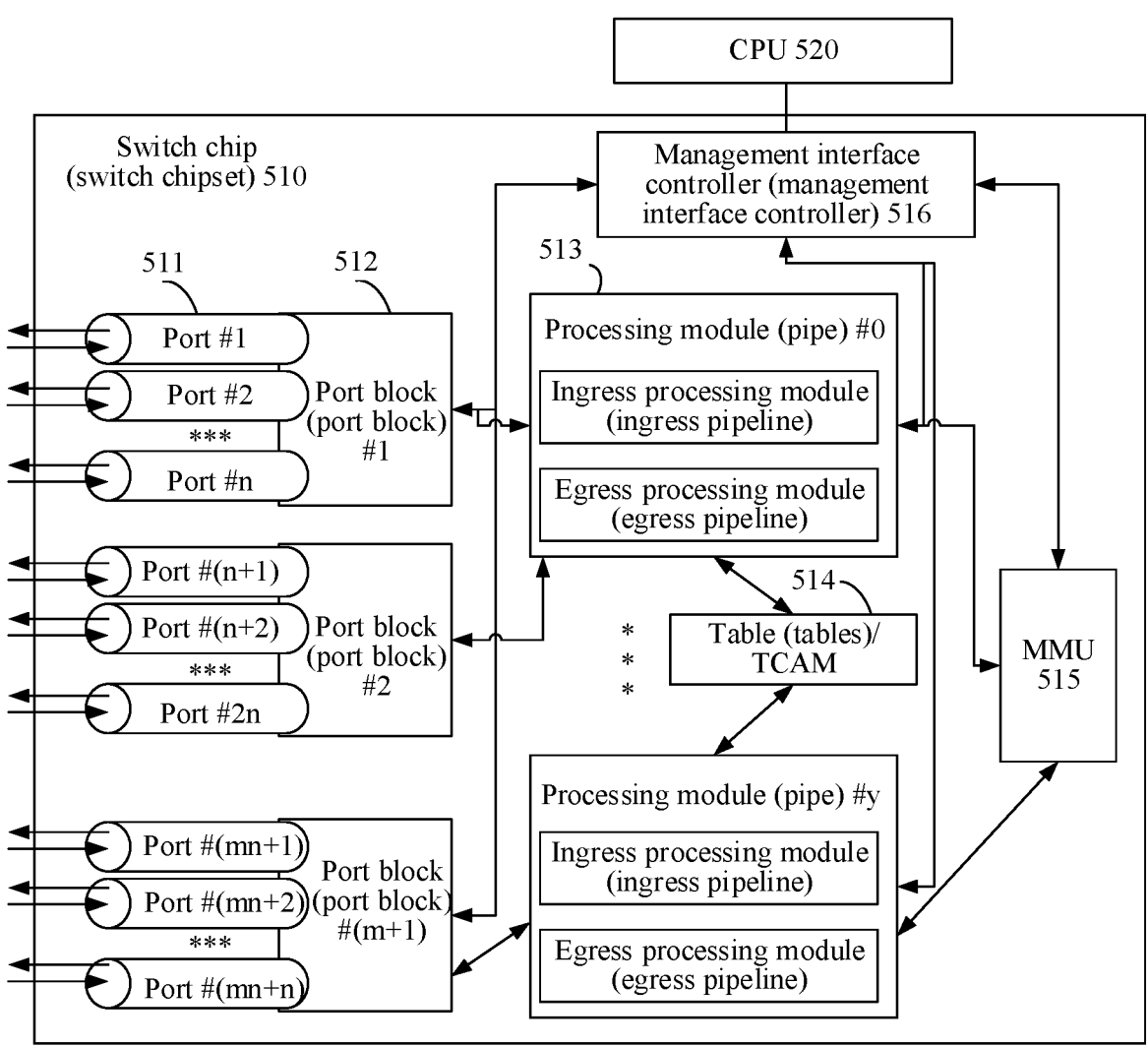
FIG. 3 is a schematic diagram of a structure of a communication device according to an embodiment of this application.

FIG. 3 is an example of a schematic diagram of a structure of a communication device according to an embodiment of this application. The communication device may be a forwarding device. The following uses an example in which the communication device is a switch for description.

As shown in FIG. 3, the communication device may include a switch chip 510 for processing traffic forwarding and a central processing unit (CPU) 520 for managing and controlling the switch chip.

The switch chip 510 includes one or more ports 511, for example, a port #1, a port #2, . . . , a port #(mn+n), where m may be an integer greater than 1, and n may be an integer greater than 2. A quantity of ports in FIG. 3 is merely an example. In practice, the communication device may include more or fewer ports than those in FIG. 3.

As shown in FIG. 3, a plurality of ports may be aggregated into one port block. FIG. 3 shows an example of a plurality of port blocks 512, for example, a port block #1, a port block #2, . . . , and a port block #(m+1) in FIG. 3. The port block 512 may decode a packet coming from the outside into frames, and send the frames to a processing module 513. FIG. 3 shows an example of a plurality of processing modules, for example, a processing module (pipe) #0, . . . , and a processing module (pipe) #y. The port block 512 may further receive a to-be-sent packet from the processing module 513, and encode and send the to-be-sent packet.

The processing module 513 may include an ingress processing module (Ingress Pipeline) and an egress processing module (Egress Pipeline). The ingress processing module (Ingress Pipeline) may be configured to extract packet information, generate a packet description, perform table lookup (for example, a table/a ternary content addressable memory (TCAM) 514 in FIG. 3), and then send the packet to a memory management unit (MMU) 515. After being scheduled, the MMU 515 sends the packet to an egress processing module (Egress Pipeline) connected to a corresponding port for processing such as encoding and encapsulation, and sends the processed packet through a selected port. In this processing process, a table lookup and forwarding decision may be implemented in the ingress processing module (Ingress Pipeline), including traffic load balancing.

When the communication device shown in FIG. 3 is the second communication device, and the load balancing device is located in the second communication device, the load balancing device may include the processor 520 in FIG. 3, may be the processor 520, or may be a module disposed in the processor 520 in FIG. 3. Second hash algorithm information determined by the load balancing device may be delivered to the switch chip 510 by using the processor 520. It should be noted that, in addition to determining the second hash algorithm information used by the second communication device for load balancing, the load balancing device may further adjust a quantity of ports used by the second communication device to forward the packet. When adjusting the quantity of ports used by the second communication device to forward the packet, the load balancing device may further deliver the adjusted quantity of ports to the switch chip 510 by using the processor 520. A management interface controller 516 of the switch chip 510 may deliver the second hash algorithm information and/or information about the quantity of ports of the second communication device that are/is received from the processor CPU 520 to a specified component, for example, the processing module 513. The management interface controller 516 may further feed back a related configuration (for example, a current quantity of ports of the second communication device) of the second communication device to the processor 520.

The management interface controller 516 may further send, to the processor 520, a specified packet received from a port, or may send, to the switch chip for sending, a packet that needs to be sent by the processor CPU 520. For example, the communication device shown in FIG. 3 is the second communication device, and the load balancing device is a device independent of the second communication device. The load balancing device may send the second hash algorithm information to the second communication device. The second communication device sends a packet received through a port to the processor 520. The processor 520 parses the packet to determine the second hash algorithm information, and delivers the second hash algorithm information to the switch chip 510. If adjusting the quantity of ports used by the second communication device to forward the packet, the load balancing device may further send the adjusted quantity of ports to the second communication device. The second communication device delivers the adjusted quantity of ports to the switch chip 510 after obtaining the adjusted quantity of ports by using the processor 520.

Figure 4:
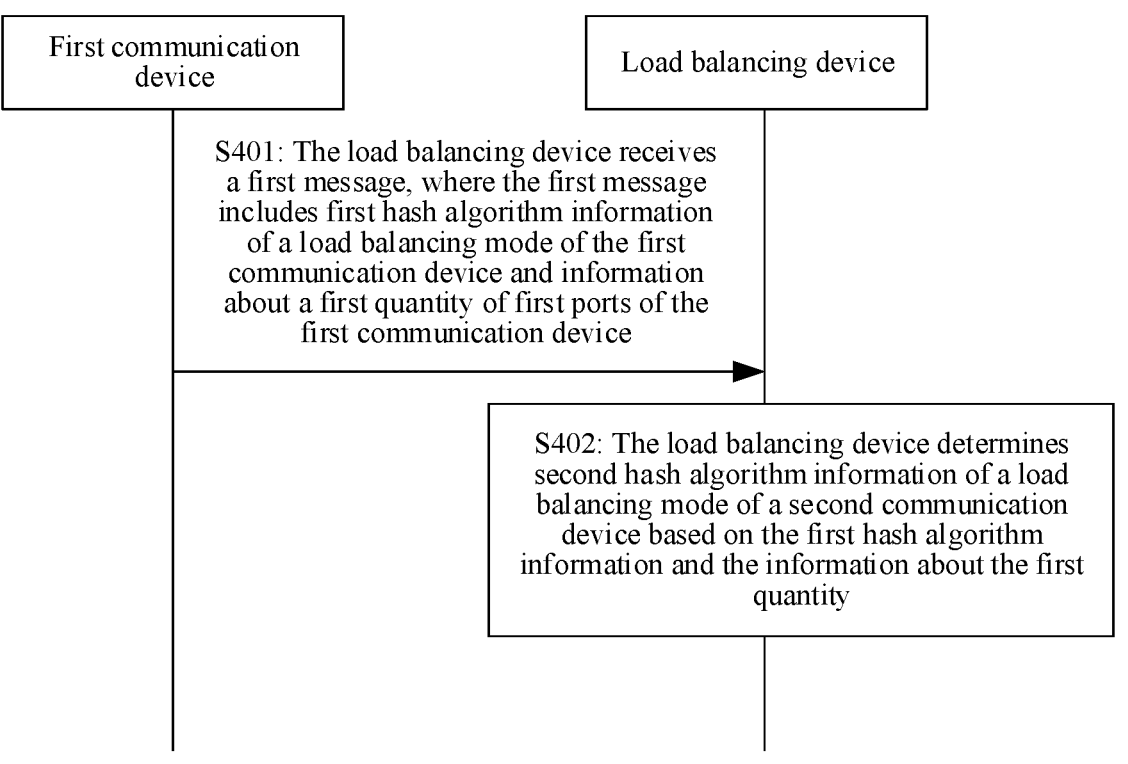
FIG. 4 is a schematic flowchart of a method for determining hash algorithm information for load balancing according to an embodiment of this application.

Based on the foregoing content, FIG. 4 is an example of a schematic flowchart of a method for determining hash algorithm information for load balancing according to an embodiment of this application. The method may be the load balancing device in FIG. 1A to FIG. 2C. As shown in FIG. 4, the method includes the following steps.

S401: A load balancing device receives a first message, where the first message includes first hash algorithm information of a load balancing mode of a first communication device and information about a first quantity of first ports of the first communication device.

In this embodiment of this application, the first hash algorithm information and the information about the first quantity of first ports of the first communication device may be directly sent by the first communication device to the load balancing device, or may be sent by another device, for example, may be sent by an information sharing module. Before S401, the information sharing module may obtain the first hash algorithm information of the first communication device and the information about the first quantity of first ports of the first communication device from the first communication device.

S402: The load balancing device determines second hash algorithm information of a load balancing mode of a second communication device based on the first hash algorithm information and the information about the first quantity.

In this embodiment of this application, the load balancing device may be a module or a unit in the second communication device, or may be a module or a unit of a device independent of the first communication device and the second communication device. If the load balancing device is a device independent of the first communication device and the second communication device, the load balancing device may send the second hash algorithm information to the second communication device after S402. In this way, the second communication device may forward the packet based on the second hash algorithm information.

Because the load balancing device may communicate with the first communication device, the first hash algorithm information and the information about the first quantity may be obtained. Further, the second hash algorithm information determined based on the first hash algorithm information and the information about the first quantity of first ports of the first communication device may be more proper.

Embodiments of this application relate to a plurality of types of hash algorithm information that are referred to as the first hash algorithm information, the second hash algorithm information, and the like for differentiation. Each type of hash algorithm information may include at least one of a parameter item of hash key information, an arrangement order of parameter items of the hash key information, a hash algorithm, or a manner of obtaining a hash value. For differentiation, parameters in the first hash algorithm information are respectively referred to as a first hash algorithm, a parameter item of first hash key information, an arrangement order of parameter items of the first hash key information, a manner of obtaining a value of the first hash algorithm, and a manner of obtaining a first hash value. Parameters in the second hash algorithm information are respectively referred to as a second hash algorithm, a parameter item of second hash key information, an arrangement order the parameter items of the second hash key information, a manner of obtaining a value of the second hash algorithm, and a manner of obtaining a second hash value. In addition, parameters in third hash algorithm information that appears subsequently is referred to as a third hash algorithm, a parameter item of third hash key information, an arrangement order of parameter items of the third hash key information, a manner of obtaining a value of the third hash algorithm, and a manner of obtaining a third hash value.

The following uses the first hash algorithm information as an example to describe parameters included in hash algorithm information. Other hash algorithm information (such as the second hash algorithm information and the third hash algorithm information) is similar thereto, and details are not described again.

Parameter a1: Parameter Item of the Hash Key Information

The parameter item of the hash key information may include a field carried in a packet, for example, a network layer destination address, a network layer source address, a transport layer destination port, a transport layer source port, a network layer protocol identifier, a congestion notification tag (CNTag), a virtual network tag (VNTag), and a virtual local area network (VLAN) identifier.

In another possible implementation, the parameter item of the hash key information in this embodiment of this application further includes an area (which may also be understood as a bit width, a bit length, or the like) of a parameter value of the parameter item that constitutes the hash key information. For example, the parameter item of the hash key information may include high-order 16 bits of the network layer destination address, low-order 16 bits of the network layer source address, high-order 16 bits of the network layer source address, or the like. It can be learned that, by using the parameter item of the hash key information, a bit that needs to be extracted from a parameter value corresponding to each parameter item used to construct the hash key information may be determined.

The parameter item of the hash key information may further include information about a communication device to which the packet currently belongs. For example, for the first packet received by the first communication device, the parameter item of the hash key information corresponding to the first hash algorithm information of the first communication device may include an identifier of the first port that the first packet arrives at and that is of the first communication device, an identifier of the first communication device (where it should be noted that the identifier of the first communication device is configurable, the identifier of the first communication device may vary in different systems, and this is not limited in this embodiment of this application), and the like.

It should be noted that, for some packets, a parameter item of the foregoing hash key information of the packet may not be extracted. In this case, a communication device that performs load balancing for the packets may fill the field with a default value, 0, or another specified value.

For example, the first communication device receives the first packet. If the first packet is an ARP packet, the parameter item of the hash key information corresponding to the first hash algorithm information may include a field carried in the packet, for example, a network layer destination address, a network layer source address, a transport layer destination port, a transport layer source port, a network layer protocol identifier, a CNTag, a VNTag, and a VLAN identifier. Because the first packet does not have network layer information and transport layer information, the network layer information and transport layer information, for example, a network layer destination address, a network layer source address, a transport layer destination port, and a transport layer source port, of the first packet, cannot be extracted. In this case, when constructing hash key information corresponding to the first packet, the first communication device may fill values corresponding to parameter items corresponding to the network layer information and the transport layer information with a default value, 0, or another specified value.

Parameter a2: Arrangement Order of Parameter Items of the Hash Key Information

The arrangement order of parameter items of the hash key information may change. For example, the parameter items of the hash key information corresponding to the first hash algorithm information and the parameter items of the hash key information corresponding to the second hash algorithm information are the same, but arrangement orders of the parameter items are different.

Parameter a3: Hash Algorithm

For one piece of hash algorithm information, after the hash key information is constructed based on the parameter a1 and the parameter a2, operation may be performed based on a hash algorithm corresponding to the hash algorithm information, to obtain an operation result corresponding to the hash algorithm.

The hash algorithm may be an algorithm for calculating the hash key information, for example, a cyclic redundancy check (CRC) algorithm, an exclusive OR folding (XOR folding) or exclusive OR (XOR) object, and a segmentation summation.

The CRC algorithm essentially is to perform a successive XOR operation on the hash key information (a string of bits) to obtain a remainder. For example, it is assumed that the hash key information is 16-bit binary information g=1011 0110 0100 0011. This binary code may be represented as an algebraic polynomial $g(x)=x^{15}+x^{13}+x^{12}+x^{10}+x^9+x^6+x^1+1$, where a value of a $k^{th}$ bit in g corresponds to a coefficient of $x^k$ in g(x). g(x) is multiplied by $x^m$, that is, m 0 s are added after g, and then divided by an m-order polynomial h(x), to obtain an (m−1)-order remainder r(x), where a binary code r corresponding to the remainder r(x) is a CRC calculation result.

That is, in the CRC algorithm, the hash key information used as a dividend and the m-order polynomial h(x) used as a divisor change, where h(x) is also usually referred to as a generator polynomial. Usually, generator polynomials are used to identify and distinguish between different CRC algorithms. For example, what is commonly referred to as a "CRC algorithm A" is actually "a generator polynomial used by the CRC algorithm is A" or "a name of the generator polynomial used by the CRC algorithm is identified as A", for example, it can be referred to as "CRC-16-CCITT" or "CRC 0×1021", where "CRC-16-CCITT" is an agreed CRC name, and 0×1021 is a generator polynomial. Certainly, a device or another CRC algorithm implementation entity may alternatively name a CRC for identification and differentiation.

Parameter a4: Hash Value Setting Manner

In this embodiment of this application, for one piece of hash algorithm information, a value obtained by performing operation on hash key information by using a hash algorithm corresponding to the hash algorithm information may be used to determine, based on a manner of obtaining a hash value corresponding to the hash algorithm information, the hash value from the value.

For example, the manner of obtaining the hash value includes: extracting low-order 16 bits of a hash algorithm operation result as the hash value, extracting high-order 16 bits of the hash algorithm operation result as the hash value, or extracting all bits of the hash algorithm operation result as the hash value.

To alleviate network polarization, the first hash algorithm information and the second quantity of second ports of the second communication device meet at least one of the following: The first quantity is different from the second quantity, and the first hash algorithm information is the same as the second hash algorithm information; the first quantity is different from the second quantity, and the first hash algorithm information is different from the second hash algorithm information; or the first quantity is the same as the second quantity, and the first hash algorithm information is different from the second hash algorithm information.

The first communication device performs a modulo operation on the first quantity by using a hash value when performing load balancing, and the second communication device performs a modulo operation on the second quantity by using a hash value when performing load balancing. Therefore, when the first quantity is different from the second quantity, the first hash algorithm information and the second hash algorithm information may be different or may be the same. Even if the first hash algorithm information is the same as the second hash algorithm information, for packets that are obtained after balancing is performed based on the first hash algorithm information and the first quantity and that are received by the second communication device, the second communication device may also send a plurality of received packets through different links. Therefore, a network polarization phenomenon can be alleviated.

In another case, if the first quantity is the same as the second quantity, and the first hash algorithm information is different from the second hash algorithm information, for packets on which balancing is performed based on the first hash algorithm information and the first quantity and that are received by the second communication device, the second communication device may also send a plurality of received packets through different links. Therefore, a polarization phenomenon in a network can be alleviated.

When the first hash algorithm information is different from the second hash algorithm information, the first hash algorithm information and the second hash algorithm information meet at least one of the following:

The first hash algorithm is different from the second hash algorithm; the parameter item of the first hash key information is different from the parameter item of the second hash key information; the arrangement order of parameter items of the first hash key information is different from the arrangement order of parameter items of the second hash key information; or the manner of obtaining the first hash value is different from the manner of obtaining the second hash value.

If at least one of the foregoing content is met, for the first packet and the second packet that are from the first communication device, even if two hash modulus values obtained by performing a modulo operation on the first quantity by using two hash values are the same, where the two hash values are obtained by separately performing hash calculation on the first packet and the second packet based on the first hash algorithm information, two hash modulus values obtained by performing a modulo operation on the second quantity by using two hash values may be different, where the two hash values are obtained by separately performing hash calculation on the first packet and the second packet based on the second hash algorithm information. Further, the first packet and the second packet may be respectively sent through two different links corresponding to the two hash modulus values, thereby reducing network polarization.

In this embodiment of this application, a noun of a quantity of ports of a communication device is defined. For differentiation, a quantity of first ports of the first communication device is referred to as the first quantity, and a quantity of second ports of the second communication device is referred to as the second quantity. In a possible implementation, the first quantity includes a quantity of equal-cost multi-path group (ECMP group) members of the first communication device, or a quantity of link aggregation group (LAG group) members of the first communication device. Description is separately provided below.

Implementation 1: The first quantity of first ports of the first communication device may be the quantity of equal-cost multi-path group (ECMP group) members of the first communication device.

For example, the quantity of equal-cost multi-path group (ECMP group) members of the first communication device may also be understood as a quantity of layer-3 paths that are of the first communication device and that can be used by the first communication device to transmit a received packet (for example, the first packet) to a destination IP address of the first packet (where the quantity of layer-3 paths may also be understood as a quantity of layer-3 logical ports).

The quantity of equal-cost multi-path group (ECMP group) members of the first communication device may also be understood as a quantity of layer-3 ports (or referred to as ports) that are of the first communication device and that correspond to an IP subnet address in the destination IP address of the first packet. The quantity of ports may also be understood as a quantity of equal-cost paths, a quantity of next hops, or a quantity of logical ports (or referred to as logical ports).

Implementation 2: The first quantity of first ports of the first communication device may be a quantity of link aggregation group (LAG group) members of the first communication device.

For example, the quantity of link aggregation group (LAG group) members of the first communication device may also be understood as a quantity of layer-2 ports that are of the first communication device and that can be used by the first communication device to transmit a received packet (for example, the first packet) to a destination MAC address of the first packet (where the quantity of layer-2 ports may also be understood as a quantity of layer-2 physical ports).

The quantity of link aggregation group (LAG group) members of the first communication device may also be understood as a quantity of layer-2 ports (or referred to as ports) that are of the first communication device and that correspond to the destination MAC address of the first packet, and the quantity of ports may also be understood as a quantity of physical ports (or referred to as physical ports).

Similarly, the second hash algorithm information may be applied to processing of a layer-3 load balancing mode of the second communication device. The second quantity of second ports of the second communication device may include a quantity of equal-cost multi-path group (ECMP group) members of the second communication device. The second hash algorithm information may be applied to processing of a layer-2 load balancing mode of the second communication device. The second quantity of second ports of the second communication device may include a quantity of link aggregation group (LAG group) members of the second communication device. Specific content is similar to the foregoing content, and details are not described again.

In S402, in a possible implementation, the load balancing device may determine the second hash algorithm information based on the first hash algorithm information, the information about the first quantity, and the information about the second quantity of second ports of the second communication device. In this way, the second hash algorithm information can be more properly determined with reference to the quantity of ports of the second communication device.

It can be learned from the example provided in FIG. 2A that, for a plurality of packets that are received at the leaf level and that are from communication devices of a same TOR or different TORs, the leaf-level communication device 8 sends the plurality of packets through only one link, and cannot balance the plurality of packets to a plurality of links for sending. To evenly distribute the plurality of packets from the first communication device to the plurality of links of the second communication device as much as possible, in S402, the second hash algorithm information selected by the load balancing device may meet a first condition. The first condition includes: Two hash modulus values obtained after a modulo operation is performed on the second quantity of second ports of the second communication device by using two hash values are different, where the two hash values are obtained by separately performing hash calculation on the first packet and the second packet based on the second hash algorithm information. In this way, the received first packet and the received second packet may be sent through two different ports corresponding to the two different hash modulus values, thereby alleviating network polarization.

In a possible implementation, the first packet and the second packet may be two packets that are transmitted to the second communication device after another communication device (for example, the first communication device and/or another communication device) performs load balancing on the first packet and the second packet based on the first hash algorithm information and the first quantity.

In another possible implementation, the first condition may further include: Two hash modulus values obtained by separately performing a modulo operation on the first quantity by using two hash values are the same, where the two hash values are obtained by separately performing hash calculation on the first packet and the second packet based on the first hash algorithm information. In this way, the first packet and the second packet may be sent to the second communication device after two different upper-level devices (including the first communication device and another communication device) of the second communication device perform load balancing on the first packet and the second packet based on the first hash algorithm information and the first quantity. Alternatively, the first packet and the second packet may be sent to the second communication device after a same upper-level device (for example, the first communication device) of the second communication device performs load balancing on the first packet and the second packet based on the first hash algorithm information and the first quantity, for example, may be sent to the second communication device by using a same logical link or a same physical link of the first communication device. Further, the first packet and the second packet that meet the first condition may be sent through different links after load balancing is performed on the first packet and the second packet based on the second hash algorithm information, thereby alleviating polarization.

Advantageous effects achieved when the second hash algorithm information meets the first condition are described by using an example. For example, after the first communication device receives the first packet and the second packet from a same communication device or from different communication devices, two hash modulus values obtained by the first communication device by separately performing a modulo operation on the first quantity by using two hash values are the same, where the two hash values are obtained by separately performing hash calculation on the first packet and the second packet based on the first hash algorithm information. Therefore, the first communication device determines to separately send the first packet and the second packet to the second communication device through a same link. However, two hash modulus values obtained by the second communication device by separately performing a modulo operation on the second quantity by using two hash values are different, where the two hash values are obtained by separately performing hash calculation on the first packet and the second packet based on the second hash algorithm information. Therefore, the first packet and the second packet are separately sent to a next hop through two different links. In this way, when the second hash algorithm information meets the first condition, packets that have a same feature and that are filtered by a previous-hop communication device may be sent out through different links as much as possible, thereby alleviating polarization caused by improper selection of hash algorithm information mentioned in FIG. 2A.

Figure 5:
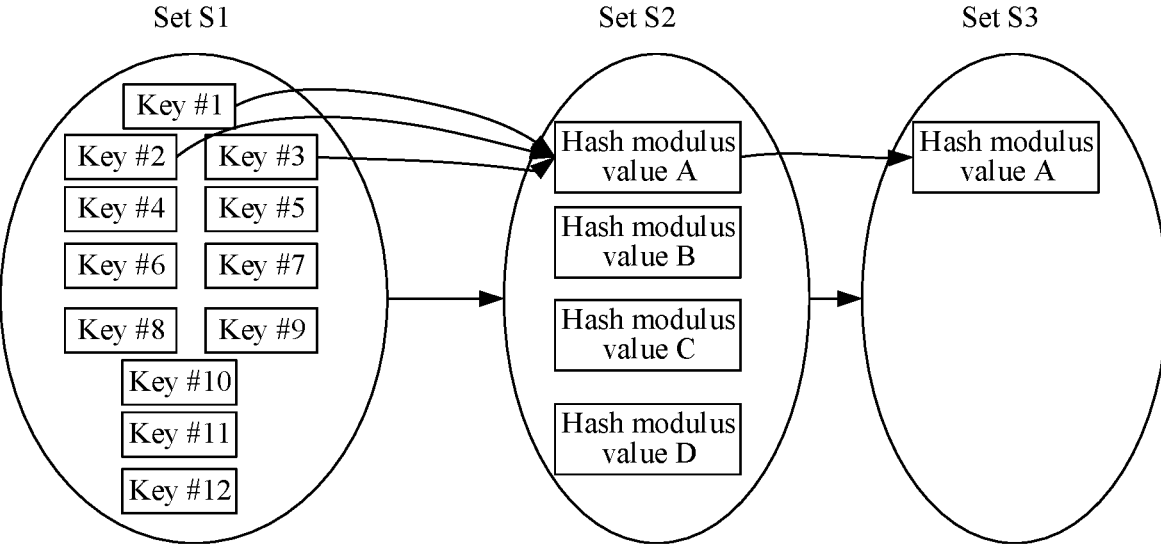
FIG. 5 is a schematic diagram of distribution of diversity of hash key information according to an embodiment of this application.

The following describes causes for polarization from another perspective. FIG. 5 is an example schematic diagram of distribution of diversity of hash key information according to an embodiment of this application. As shown in FIG. 5, a set S1 includes 12 pieces of hash key information corresponding to packets generated by a first communication device: a key #1, a key #2, . . . , and a key #12. A set S2 shows a schematic diagram of hash modulus values obtained by performing a modulo operation on the first quantity by using hash values, where the hash values are obtained by separately performing operation on the 12 pieces of hash key information in the set S1 based on the first hash algorithm information. As shown in FIG. 5, a total of 12 hash modulus values are calculated for the 12 pieces of hash key information in the set S1. There are duplicate values in the 12 hash modulus values, and there are four different hash modulus values left by deduplicating the 12 hash modulus values, which are a hash modulus value A, a hash modulus value B, a hash modulus value C, and a hash modulus value D. It may be understood that the first communication device may distribute data streams corresponding to the 12 pieces of hash key information over four links (or four equal-cost multi-path group (ECMP group) members or four link aggregation group (LAG group) members) for sending. For a communication device, there is a correspondence between a hash modulus value calculated by the communication device and a sending link of the communication device, and two hash modulus values calculated by the communication device may correspond to two sending links.

If hash modulus values that correspond to the hash key information key #1, key #2, and key #3 and that are calculated by the first communication device in FIG. 5 are both the hash modulus value A, data streams corresponding to the hash key information key #1, key #2, and key #3 are all sent through a same link, for example, all sent to the second communication device.

However, if the second communication device still uses the first hash algorithm information for balancing, and the first quantity of first ports of the first communication device is the same as the quantity of ports of the second communication device, hash modulus values that correspond to the hash key information key #1, key #2, and key #3 and that are calculated by the second communication device are both the hash modulus value A. In this case, data streams corresponding to the hash key information key #1, key #2, and key #3 are not load balanced on the second communication device, but are sent through a same link. Consequently, polarization may occur.

If the hash modulus values obtained by calculating the hash key information is understood as diversity, as shown in FIG. 5, on the first communication device, a deduplicated quantity of 12 hash modulus values corresponding to the 12 pieces of hash key information is 4, it may be understood as that diversity corresponding to the first hash algorithm information on the first communication device is 4. However, if the second communication device still uses the first hash algorithm information for balancing, and the first quantity of first ports of the first communication device is the same as the quantity of ports of the second communication device, on the second communication device, a deduplicated quantity of three hash modulus values corresponding to three pieces of hash key information (key #1, key #2, and key #3) is 1 (as shown in a set S3 in FIG. 5), that is, diversity corresponding to the three pieces of hash key information (key #1, key #2, and key #3) is 1. In this case, regardless of how many sending links there are on the second communication device, data streams corresponding to the three pieces of hash key information are sent through only one link. It can be learned that, because the hash algorithm information selected by the second communication device causes a decrease in diversity of packets obtained through load balancing processing performed by the first communication device, polarization occurs.

To alleviate the polarization problem, this embodiment of this application further provides a possible implementation. In this implementation, S402 may be replaced with the following:

The load balancing device determines a fourth quantity corresponding to hash algorithm information in N pieces of hash algorithm information, where N is a positive integer, and selects, from the N pieces of hash algorithm information, hash algorithm information whose corresponding fourth quantity is greater than 1 as the second hash algorithm information.

For the hash algorithm information in the N pieces of hash algorithm information, the fourth quantity corresponding to the hash algorithm information is a deduplicated quantity of M hash modulus values obtained by separately performing a modulo operation on the second quantity of second ports hash modulus values obtained by separately performing a modulo operation on the first quantity by using M hash values are the same, where the M hash values are obtained by separately performing hash calculation on the M packets based on the first hash algorithm information. In this way, if receiving the M packets, another communication device sends the M packets to the second communication device after load balancing is performed on the M packets based on the first hash algorithm information and the first quantity. In this way, the M packets that meet the second condition may be sent through different links after load balancing is performed on the M packets based on the second hash algorithm information, thereby alleviating polarization.

For example, with reference to FIG. 5, the M packets may be packets corresponding to the hash key information key #1, key #2, and key #3, and the selected second hash algorithm information needs to meet the following condition: A deduplicated quantity of M hash modulus values obtained by separately performing a modulo operation on the second quantity by using M hash values is greater than 1, where the M hash values are obtained by separately performing hash calculation on the M packets based on the second hash algorithm information. In this way, at least two links may be selected for sending of the packets corresponding to the hash key information key #1, key #2, and key #3, thereby alleviating polarization.

The following uses Table 1 as an example to describe the foregoing content.

TABLE 1

| First quantity of first ports of the first communication device | Hash algorithm corresponding to the first hash algorithm information | Deduplicated quantity of hash modulus values obtained by performing operation on received packets by the first communication device | Deduplicated values of the hash modulus values obtained by performing operation on the received packets by the first communication device | Quantity of ports of the second communication device | Hash algorithm corresponding to the second hash algorithm information | Deduplicated quantity of hash modulus values obtained by performing operation on received packets by the second communication device | Deduplicated values of the hash modulus values obtained by performing operation on the received packets by the second communication device |
|---|---|---|---|---|---|---|---|
| | | | Distribution of hash modulus values obtained by performing operation on received packets by a first communication device and a second communication device | | | | |
| 4 | CRC16a | 2 | 0 3 | 4 | CRC16a | 1 | 0 |
| | | | 0 3 | 4 | CRC16b | 4 | 1, 2, 3, 0 |
| | | | 0 3 | 4 | CRC32HI | 1 | 0 |
| | | | 0 3 | 4 | CRC32LO | 4 | 2, 0, 1, 3 | of the second communication device by using M hash values, where the M hash values are obtained by separately performing hash calculation on M packets based on the hash algorithm information, and M is an integer greater than 1. In this way, the M packets may be allocated to at least two links after load balancing is performed on the M packets based on the second hash algorithm information and the second quantity, thereby alleviating network polarization.

In a possible implementation, the M packets may be M packets that are transmitted to the second communication device after another communication device (for example, the first communication device and/or another communication device) performs load balancing on the M packets based on the first hash algorithm information and the first quantity.

In another possible implementation, the M packets meet a second condition, and the second condition includes: M To describe this embodiment of this application more clearly, in Table 1, it is assumed that the first quantity of first ports of the first communication device is the same as the quantity of ports of the second communication device, a parameter item of hash key information corresponding to the first hash algorithm information is the same as a parameter item of hash key information corresponding to the second hash algorithm information, a sorting manner of parameter items of the hash key information corresponding to the first hash algorithm information is the same as a sorting manner of parameter items of the hash key information corresponding to the second hash algorithm information, and a manner of obtaining a hash value corresponding to the first hash algorithm information is the same as a manner of obtaining a hash value corresponding to the second hash algorithm information.

As shown in Table 1, a hash algorithm corresponding to the first hash algorithm information used by the first communication device is CRC16a. A deduplicated quantity of a total quantity of hash modulus values obtained by performing a modulo operation on the first quantity by using hash values is 2, where the hash values are obtained by performing operation on the received packets by the first communication device based on the first hash algorithm information, and the two values may be represented as 0 and 3. A hash modulus value 0 corresponds to the first port of the first communication device, and a hash modulus value 3 corresponds to a fourth port of the first communication device. The first port of the first communication device is connected to the second communication device. In other words, all packets received by the second communication device are packets (where the packets may be understood as the foregoing M packets) whose hash modulus values are 0 obtained by the first communication device through calculation.

Still refer to Table 1. If a hash algorithm corresponding to the second hash algorithm information used by the second communication device is CRC16a, for the M packets received from the first communication device, a deduplicated quantity of a total quantity of hash modulus values obtained by performing a modulo operation on the first quantity by using hash values is 1, where the hash values are obtained by performing operation on the received M packets by the second communication device based on CRC16a. As shown in Table 1, the value is 0. That is, when the first hash algorithm information is the same as the second hash algorithm information, and the first quantity is the same as the second quantity, the hash modulus values that correspond to the M packets and that are obtained by the first communication device by performing calculation based on the M packets are all 0, the hash modulus values that correspond to the M packets and that are obtained by the second communication device by performing calculation based on the M packets are also all 0. The second communication device sends the M packets through a port corresponding to the hash modulus value 0.

Still refer to Table 1. If a hash algorithm corresponding to the second hash algorithm information used by the second communication device is CRC16b, for the M packets received from the first communication device, a deduplicated quantity of a total quantity of hash modulus values obtained by performing a modulo operation on the first quantity by using hash values is 4, where the hash values are obtained by the second communication device by performing operation on the received M packets based on CRC16b. As shown in Table 1, the four values are respectively 1, 2, 3, 0. That is, the second communication device may send the M packets from the first communication device through four links, thereby alleviating network polarization.

Still refer to Table 1. If a hash algorithm corresponding to the second hash algorithm information used by the second communication device is CRC32HI, for the M packets received from the first communication device, a deduplicated quantity of a total quantity of hash modulus values obtained by performing a modulo operation on the first quantity by using hash values is 1, where the hash values are obtained by the second communication device by performing operation on the received M packets based on 32HI. As shown in Table 1, the value is represented as 0. That is, the second communication device may send the M packets from the first communication device through only one link, causing polarization.

Still refer to Table 1. If a hash algorithm corresponding to the second hash algorithm information used by the second communication device is CRC32LO, for the M packets received from the first communication device, a deduplicated quantity of a total quantity of hash modulus values obtained by performing a modulo operation on the first quantity by using hash values is 4, where the hash values are obtained by the second communication device by performing operation on the received M packets based on CRC32LO. As shown in Table 1, the four values are respectively 2, 0, 1, 3. (Compared with the solution in which CRC16b is used for the second communication device, a diversity quantity is the same while a distribution sequence of diversity values is different.) That is, the second communication device may send the M packets from the first communication device through four links, thereby alleviating network polarization.

It can be learned from Table 1 that when the hash algorithm corresponding to the first hash algorithm information is different from the hash algorithm corresponding to the second hash algorithm information, for example, CRC16a is used for the first hash algorithm information, and CRC32HI is used for the second hash algorithm information, polarization may also occur. Therefore, the polarization problem cannot be alleviated only by limiting different hash algorithms used by the first hash algorithm information and the second hash algorithm information. However, in the solution provided in this embodiment of this application, the selected second hash algorithm information needs to meet the following condition: A deduplicated quantity of M hash modulus values obtained by separately performing a modulo operation on the second quantity by using M hash values is greater than 1, where the M hash values are obtained by separately performing hash calculation on the M packets based on the second hash algorithm information. In this way, the polarization problem can be alleviated.

It should be noted that, Table 1 shows an example in which the first quantity of first ports of the first communication device is equal to the quantity of ports of the second communication device, a parameter item of hash key information corresponding to the first hash algorithm information is the same as a parameter item of hash key information corresponding to the second hash algorithm information, a sorting manner of parameter items of the hash key information corresponding to the first hash algorithm information is the same as a sorting manner of parameter items of the hash key information corresponding to the second hash algorithm information, and a manner of obtaining a hash value corresponding to the first hash algorithm information is the same as a manner of obtaining a hash value corresponding to the second hash algorithm information. Values in a $7^{th}$ column and values in an $8^{th}$ column in Table 1 may change accordingly when at least one of the following is met: The first quantity of first ports of the first communication device is different from the quantity of ports of the second communication device, a parameter item of hash key information corresponding to the first hash algorithm information is different from a parameter item of hash key information corresponding to the second hash algorithm information, and a sorting manner of parameter items of the hash key information corresponding to the first hash algorithm information is different from a sorting manner of parameter items of the hash key information corresponding to the second hash algorithm information, and a manner of obtaining a hash value corresponding to the first hash algorithm information is different from a manner of obtaining a hash value corresponding to the second hash algorithm information.

TABLE 2

| First quantity of first ports of the first communication device | Hash algorithm corresponding to the first hash algorithm information | Deduplicated quantity of hash modulus values obtained by performing operation on received packets by the first communication device | Deduplicated values of the hash modulus values obtained by performing operation on the received packets by the first communication device | Quantity of ports of the third communication device | Hash algorithm corresponding to the third hash algorithm information | Deduplicated quantity of hash modulus values obtained by performing operation on received packets by the third communication device | Deduplicated values of the hash modulus values obtained by performing operation on the received packets by the third communication device |
|---|---|---|---|---|---|---|---|
| 4 | CRC16a | 2 | 0 | | | | |
| | | | 3 | 4 | CRC16a | 1 | 3 |
| | | | 0 | | | | |
| | | | 3 | 4 | CRC16b | 4 | 3, 0, 1, 2 |
| | | | 0 | | | | |
| | | | 3 | 4 | CRC32HI | 1 | 2 |
| | | | 0 | | | | |
| | | | 3 | 4 | CRC32LO | 4 | 3, 1, 0, 2 |

To describe this embodiment of this application more clearly, Table 2 shows example distribution of the hash modulus values obtained by performing operation on the received packets by the first communication device in Table 1 and the third communication device. Different from Table 1, Table 2 shows a manner of processing a packet whose hash modulus value is 3 obtained through hashing performed by the first communication device. The following describes the manner in detail. For other content, refer to the foregoing description in Table 1. Details are not described again.

The hash modulus value 3 on the first communication device corresponds to a fourth port of the first communication device. The fourth port of the first communication device is connected to the third communication device. In other words, all packets received by the third communication device are packets whose hash modulus value is 3 obtained by the first communication device through calculation. (For a solution of selecting hash algorithm information for the third communication device in this embodiment of this application, refer to the foregoing solution of selecting hash algorithm information for the second communication device, and details are not described herein again.) In Table 2, similar to that in Table 1, it is assumed that the first quantity of first ports of the first communication device is the same as the quantity of ports of the third communication device, a parameter item of hash key information corresponding to the first hash algorithm information is the same as a parameter item of hash key information corresponding to hash algorithm information of the third communication device, a sorting manner of parameter items of the hash key information corresponding to the first hash algorithm information is the same as a sorting manner of parameter items of the hash key information corresponding to hash algorithm information of the third communication device, and a manner of obtaining a hash value corresponding to the first hash algorithm information is the same as a manner of obtaining a hash value corresponding to hash algorithm information of the third communication device.

The following uses content in a second row and a fourth row of Table 2 as an example. Content in other rows is similar, and details are not described. As shown in Table 2, if a hash algorithm corresponding to the hash algorithm information used by the third communication device is CRC16a, for the packets received from the first communication device, a deduplicated quantity of a total quantity of hash modulus values obtained by performing a modulo operation on the first quantity by using hash values is 1, where the hash values are obtained by the third communication device by performing operation on a plurality of received packets based on CRC16a. As shown in Table 2, the value is 3. If a hash algorithm corresponding to the hash algorithm information used by the third communication device is CRC16b, for the packets received from the first communication device, a deduplicated quantity of a total quantity of hash modulus values obtained by performing a modulo operation on the first quantity by using hash values is 4, where the hash values are obtained by performing operation on a plurality of received packets by the third communication device based on CRC16b. As shown in Table 2, the four values are respectively 3, 0, 1, 2.

It can be learned from Table 2 that when the hash algorithm corresponding to the first hash algorithm information is different from the hash algorithm corresponding to the hash algorithm information of the third communication device, for example, CRC16a is used for the first hash algorithm information, and CRC32HI is used for the hash algorithm information of the third communication device, polarization may also occur. Therefore, the polarization problem cannot be alleviated only by limiting different hash algorithms used by the first hash algorithm information and the second hash algorithm information. However, in the solution provided in this embodiment of this application, for the hash algorithm information selected for the third communication device, refer to the foregoing solution of selecting the second hash algorithm information. To be specific, the hash algorithm information selected for the third communication device needs to meet the following condition: A deduplicated quantity of hash modulus values obtained by separately performing a modulo operation on a quantity of ports of the third communication device based on a plurality of hash values is greater than 1, where the hash values are obtained by separately performing hash calculation on the plurality of packets based on the hash algorithm information selected for the third communication device. In this way, the polarization problem can be alleviated. For the hash algorithm information selected for the third communication device, refer to the foregoing solution of selecting the second hash algorithm information. Details are not described again.

To more evenly distribute load on various links, this embodiment of this application further provides a possible implementation. In S402, the load balancing device selects, from the N pieces of hash algorithm information, hash algorithm information whose corresponding fourth quantity is largest as the second hash algorithm information.

In other words, in this implementation, the second hash algorithm information selected by the load balancing device meets the following condition: A deduplicated quantity of M hash modulus values obtained by separately performing a modulo operation on the second quantity by using M hash values is greater than 1, where the M hash values are obtained by separately performing hash calculation on the M packets based on the second hash algorithm information. Moreover, the second hash algorithm information is a piece of hash algorithm information whose corresponding fourth quantity is largest in the N pieces of hash algorithm information. This may also be understood as a piece of hash algorithm information whose diversity loss is smallest when load balancing is performed on the M packets. The N pieces of hash algorithm information may be preconfigured selectable hash algorithm information. which can be modified and supplemented at any time.

For example, it can be learned from Table 1 that, when the first quantity of first ports of the first communication device is equal to the quantity of ports of the second communication device, which are both 4, a parameter item of hash key information corresponding to the first hash algorithm information is the same as a parameter item of hash key information corresponding to the second hash algorithm information, a sorting manner of parameter items of the hash key information corresponding to the first hash algorithm information is the same as a sorting manner of parameter items of the hash key information corresponding to the second hash algorithm information, and a manner of obtaining a hash value corresponding to the first hash algorithm information is the same as a manner of obtaining a hash value corresponding to the second hash algorithm information. If a hash algorithm corresponding to the first hash algorithm information is CRC16a, CRC16b or CRC32LO may be selected for the second hash algorithm information.

In another possible implementation, the load balancing device may pre-establish a hash algorithm information association relationship, and the hash algorithm information association relationship may be stored in a tabular form or a document in another form. The hash algorithm information association relationship includes an association relationship among the first hash algorithm information, the information about the first quantity, the information about the second quantity of second ports of the second communication device, and the second hash algorithm information. In this way, in S402, the load balancing device may query a preset hash algorithm information association relationship based on the first hash algorithm information and the information about the first quantity, to obtain the second hash algorithm information. Further, the load balancing device may query the preset hash algorithm information association relationship based on the first hash algorithm information, the information about the first quantity, and the second quantity of second ports of the second communication device, to obtain the second hash algorithm information.

Table 3 lists several examples of the hash algorithm corresponding to the first hash algorithm information and the hash algorithm corresponding to the second hash algorithm information. Table 3 is presented by using an example in which a parameter item of hash key information corresponding to the first hash algorithm information is the same as a parameter item of hash key information corresponding to the second hash algorithm information, and a sorting manner of parameter items of the hash key information corresponding to the first hash algorithm information is the same as a sorting manner of parameter items of the hash key information corresponding to the second hash algorithm information. A first row in Table 3 is used as an example for description. When the first quantity of first ports of the first communication device is 4, the hash algorithm corresponding to the first hash algorithm information is CRC16b. When the quantity of ports of the second communication device is 4, it may be recommended that CRC32LO be selected as the hash algorithm corresponding to the second hash algorithm information. The hash algorithm corresponding to the second hash algorithm information in Table 3 may be obtained through pre-calculation, or may be obtained through real-time calculation, for example, may be obtained through evaluation or mathematical solution calculation by traversing various combinations. Content of other rows is similar and is not described herein.

TABLE 3

Examples of the hash algorithm corresponding to the first hash algorithm information and the hash algorithm corresponding to the second hash algorithm information

| First quantity of first ports of the first communication device | Second quantity of second ports of the second communication device | Hash algorithm corresponding to the first hash algorithm information | Hash algorithm corresponding to the second hash algorithm information |
|---|---|---|---|
| 4 | 4 | CRC16b | CRC32LO |
| 4 | 4 | CRC32LO | CRC16b |
| 8 | 4 | CRC16b | CRC16a |
| 8 | 4 | CRC32LO | CRC16b |
| 8 | 4 | CRC16b | CRC32LO |
| 16 | 8 | CRC16b | CRC16a |
| 16 | 8 | CRC32LO | CRC16a |

It can be learned from Table 3 that, in this embodiment of this application, a system load balancing effect achieved through multi-level load balancing is quantitatively measured by using "a deduplicated quantity of hash modulus values", to pre-evaluate effects of various load balancing algorithm combinations, so that an appropriate load balancing algorithm combination is selected to alleviate system polarization, thereby obtaining a better load balancing effect. Table 3 shows examples of several combination forms of the hash algorithm corresponding to the first hash algorithm information and the hash algorithm corresponding to the second hash algorithm information. It can be learned from Table 3 that, when the first quantity of first ports of the first communication device and/or the quantity of ports of the second communication device change/changes, a combination of the hash algorithm corresponding to the first hash algorithm information and the hash algorithm corresponding to the second hash algorithm information may change. For example, in Table 3, when both the first quantity of first ports of the first communication device and the quantity of ports of the second communication device are 4, the hash algorithm corresponding to the first hash algorithm information is CRC16b, and the hash algorithm corresponding to the second hash algorithm information may be CRC32LO. When the first quantity of first ports of the first communication device is 8, and the quantity of ports of the second communication device is 4, the hash algorithm corresponding to the first hash algorithm information is CRC16b, and the hash algorithm corresponding to the second hash algorithm information may be CRC16a. It can be learned that, to achieve multi-level load balancing, a quantity of ports of a load balancing subsystem of a multi-level communication device further needs to be considered. It can also be learned that even if the hash algorithm of the first hash algorithm information and the hash algorithm of the second hash algorithm information are different, there is no fixed group of first hash algorithm information and second hash algorithm information that can definitely achieve optimal performance in resolving the polarization problem in all combinations of the quantity of ports of the first communication device and the quantity of ports of the second communication device.

In this embodiment of this application, one communication device may perform load balancing once, or may perform load balancing for a plurality of times. For example, the first communication device may perform load balancing once at the layer 3, and also perform load balancing once at the layer 2. The foregoing content is described by using an example in which the first hash algorithm information is hash algorithm information corresponding to any one time of load balancing performed by the first communication device. In another possible implementation, the first communication device may send, to the load balancing device, hash algorithm information of a plurality of times of load balancing, so that the load balancing device can determine more proper second hash algorithm information. Specifically, as shown in a schematic flowchart of a method for determining hash algorithm information for load balancing in FIG. 6, before S402, the method further includes the following steps.

S4011: The load balancing device receives a second message, where the second message includes third hash algorithm information of the load balancing mode of the first communication device and information about a third quantity of third ports of the first communication device.

S402 may be replaced with the following: The load balancing device determines the second hash algorithm information of the load balancing mode of the second communication device based on the first message and the second message.

In another possible implementation, S402 may be replaced with the following: The load balancing device determines the second hash algorithm information of the load balancing mode of the second communication device based on the first message, the second message, and the second quantity.

It should be noted that the first message and the second message may be two different messages, or may be a same message. In this case, it may also be understood that the first message further includes the third hash algorithm information and the information about the third quantity.

In the solution shown in FIG. 6, the first hash algorithm information and the third hash algorithm information may be hash algorithm information corresponding to two times of load balancing of the first communication device. In a possible implementation, the first hash algorithm information is hash algorithm information used by the first communication device for load balancing at the layer 3 based on an equal-cost multi-path technology. The first quantity includes a quantity of equal-cost multi-path group (ECMP group) members of the first communication device. The third hash algorithm information is hash algorithm information used by the first communication device for load balancing at the layer 2 based on a link aggregation group (LAG) technology. The third quantity includes a quantity of link aggregation group (LAG group) members of the first communication device.

The following describes the solution provided in FIG. 6 by using FIG. 2D and Table 4.

TABLE 4

Distribution of hash modulus values obtained by performing operation on received packets by a first communication device and a second communication device

| First quantity | Hash algorithm corresponding to the first hash algorithm information | Deduplicated quantity of hash modulus values corresponding to the first hash algorithm information | Deduplicated values of the hash modulus values corresponding to the first hash algorithm | Third quantity | Hash algorithm corresponding to the third hash algorithm information | Deduplicated quantity of hash modulus values corresponding to the third hash algorithm information | Deduplicated value of the hash modulus values corresponding to the third hash algorithm information | Second quantity | Hash algorithm corresponding to the second hash algorithm information | Deduplicated quantity of hash modulus values obtained by performing operation on received packets by the second communication device | Deduplicated value of the hash modulus values obtained by performing operation on the received packets by the second communication device |
|---|---|---|---|---|---|---|---|---|---|---|---|
| 4 | CRC16b | 4 | 0 | 4 | CRC32LO | 4 | 0 | 2 | CRC16a | 2 | 0 |
|  |  |  |  |  |  |  | 1 |  |  |  | 1 |
|  |  |  |  |  |  |  | 2 |  |  |  |  |
|  |  |  |  |  |  |  | 3 |  |  |  |  |
|  |  |  | 1 | 2 | CRC32LO | 2 | 0 |  |  |  |  |
|  |  |  |  |  |  |  | 1 |  |  |  |  |
|  |  |  | 2 | 2 | CRC32LO | 2 | 0 |  |  |  |  |
|  |  |  |  |  |  |  | 1 |  |  |  |  |
|  |  |  | 3 | 2 | CRC32LO | 2 | 0 |  |  |  |  |
|  |  |  |  |  |  |  | 1 |  |  |  |  |

The first communication device in Table 4 is, for example, the TOR-level communication device 1 in FIG. 2D, and the second communication device is, for example, the leaf-level communication device 1a. The first hash algorithm information is hash algorithm information used by the TOR-level communication device for load balancing at the layer 3. The third hash algorithm information is hash algorithm information used by the TOR-level communication device for load balancing at the layer 2.

As shown in FIG. 2D and Table 4, the TOR-level communication device 1 corresponds to four logical egress ports at the layer 3. Therefore, the first quantity is 4. The hash algorithm corresponding to the first hash algorithm information is CRC16b. A deduplicated quantity of hash modulus values corresponding to the first hash algorithm information is 4, and the values are respectively 0, 1, 2, and 3. A packet whose hash modulus value is 0 is destined for the leaf-level communication device 1. A packet whose hash modulus value is 1 is destined for the leaf-level communication device 2. A packet whose hash modulus value is 2 is destined for the leaf-level communication device 3. A packet whose hash modulus value is 3 is destined for the leaf-level communication device 4.

A quantity of physical egress ports from the TOR-level communication device 1 to the leaf-level communication device 1 is 4. Therefore, the third quantity corresponding to the hash modulus value 0 is 4. A deduplicated quantity of the hash modulus values corresponding to the third hash algorithm information is 4 (a deduplicated quantity of hash modulus values obtained by performing operation on a received packet based on the third hash algorithm information), and the values are respectively 0, 1, 2, and 3. A packet whose hash modulus value is 0 and a packet whose hash modulus value is I are destined for the leaf-level communication device 1a in the leaf-level communication device 1, and a packet whose hash modulus value is 2 and a packet whose hash modulus value is 3 are destined for the leaf-level communication device 1b in the leaf-level communication device 1.

The second communication device is the leaf-level communication device 1a, and the second quantity of egress ports of the second communication device is 2. When used second hash algorithm information is CRC16a, a deduplicated quantity of obtained hash modulus values is 2, that is, diversity of obtained packets is 2.

the diversity of packets received by the second communication device is reduced. Based on this, because it is considered that the third hash algorithm information of the first communication device may affect the diversity of the second hash algorithm information, the second hash algorithm information may be more properly determined based on the first hash algorithm information and the third hash algorithm information.

Based on the solution provided in FIG. 6, the first condition mentioned in the foregoing embodiment may further include: Two hash modulus values obtained by separately performing a modulo operation on the third quantity by using two hash values obtained by separately performing hash calculation on the first packet and the second packet based on the third hash algorithm information are connected to the second communication device through a port corresponding to the first communication device (for example, a layer-2 physical port). In this way, both the first packet and the second packet are sent to the second communication device after an upper-level device of the second communication device performs load balancing on the first packet and the second packet based on the first hash algorithm information, the first quantity, the third hash algorithm information, and the third quantity. Further, the first packet and the second packet that meet the first condition may be sent through different links after load balancing is performed on the first packet and the second packet based on the second hash algorithm information, thereby alleviating polarization.

Based on the solution provided in FIG. 6, Table 5 provides an example of a schematic table of a hash algorithm information association relationship. As shown in Table 5, the hash algorithm information association relationship mentioned in the foregoing embodiment may include an association relationship among the first hash algorithm information, the information about the first quantity, the third hash algorithm information, the information about the third quantity, information about a hash modulus value corresponding to a port that is of the first communication device and that is connected to the second communication device, the information about the second quantity of second ports of the second communication device, and the second hash algorithm information. In this way, second hash algorithm information that is more proper and has a less diversity loss may be found from the hash algorithm information association relationship based on a plurality of pieces of hash algorithm information of the first communication device.

TABLE 5

| | | | | | | | | |
|---|---|---|---|---|---|---|---|---|
| Schematic table of the hash algorithm information association relationship | | | | | | | | |
| First quantity | Hash algorithm corresponding to the first hash algorithm information | Diversity corresponding to the first hash algorithm information | Third quantity | Hash algorithm corresponding to the third hash algorithm information | Diversity corresponding to the third hash algorithm information | Second quantity | Hash algorithm corresponding to the second hash algorithm information | Diversity corresponding to the second hash algorithm information |
| 4 | CRC16b | 4 | 4 | CRC32LO | 4 | 2 | CRC16a | 2 |
| 4 | CRC32LO | 4 | 4 | CRC16b | 4 | 2 | CRC16a | 2 |
| 8 | CRC16a | 7 | 2 | CRC16b | 2 | 2 | CRC32LO | 1 |
| 8 | CRC16a | 7 | 2 | CRC32LO | 2 | 2 | CRC16b | 1 |

It can be learned from Table 4 that, although the diversity of packets output by the TOR-level communication device 1 at the layer 2 is 4, because the leaf-level communication device 1 is constituted by binding two physical leaf-level communication devices, for the leaf-level communication device 1a, the diversity of packets received from the TOR-level communication device 1 is only 2 but is not 4, that is, It should be noted that, in the network scenario shown in FIG. 2D, after deployment is completed, a quantity of links connecting a TOR-level communication device in which a computing cluster is located to a leaf-level communication device may remain unchanged, but how the links are allocated to the layer 3 ECMP and the layer 2 LAG may change, and different allocations cause changes in the first quantity and the third quantity. In this embodiment of this application, after the first quantity and the third quantity are updated, the second hash algorithm information of the second communication apparatus may be updated again based on the updated first quantity and the updated third quantity.

Figure 7A:
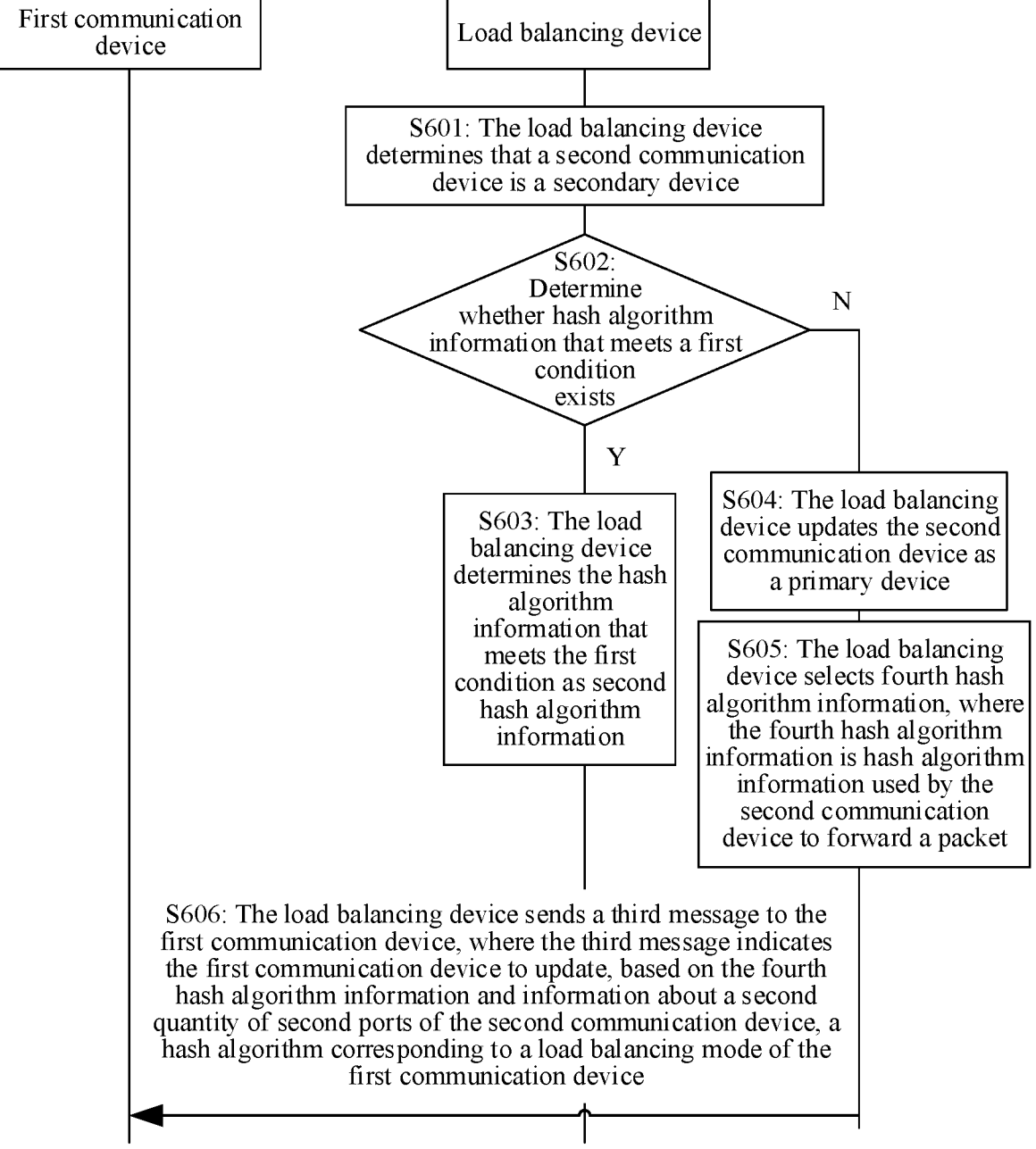
FIG. 7A is a schematic flowchart of still another method for determining hash algorithm information for load balancing according to an embodiment of this application.
Figure 7B:
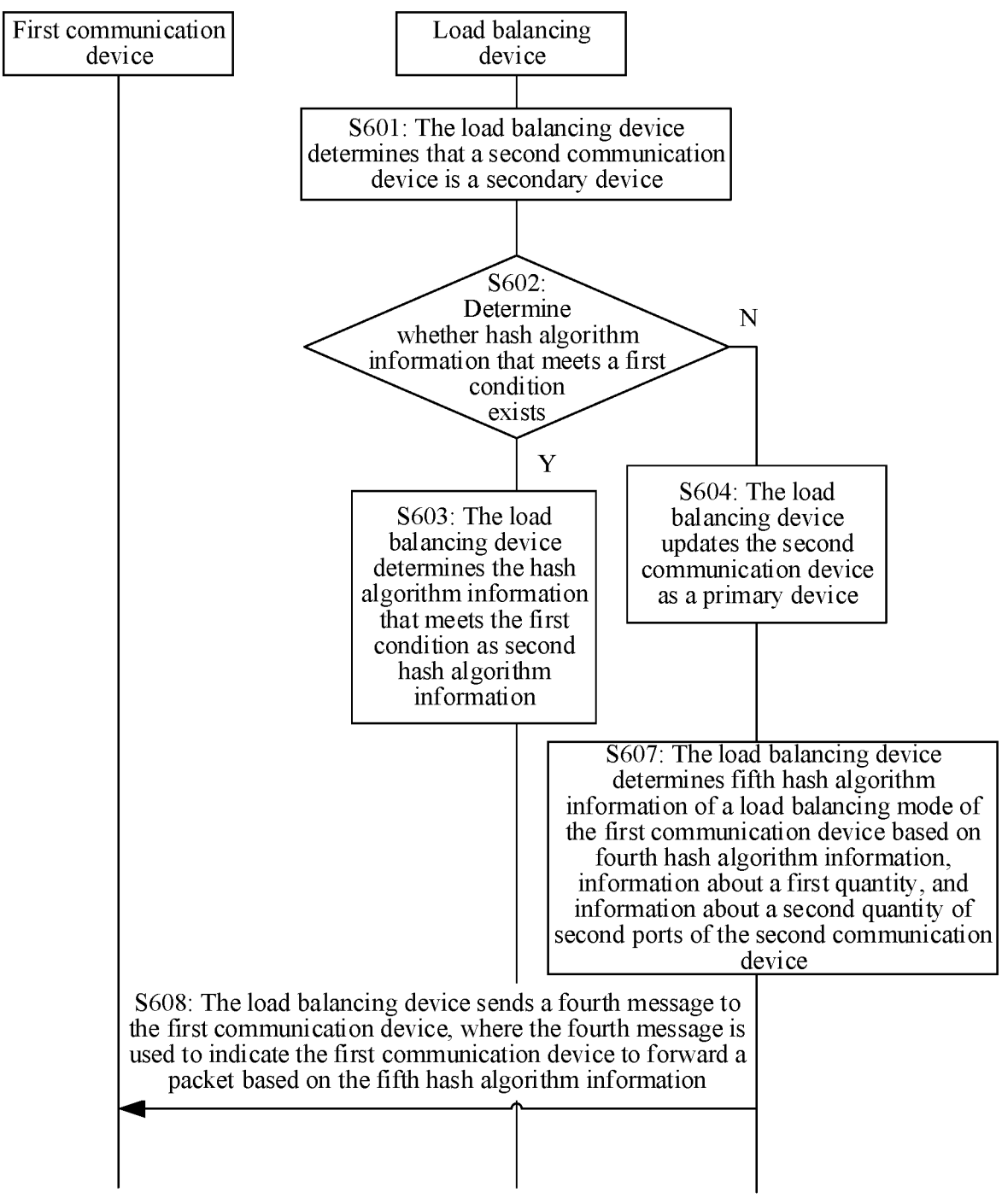
FIG. 7B is a schematic flowchart of yet another method for determining hash algorithm information for load balancing according to an embodiment of this application.

Based on the foregoing content, FIG. 7A and FIG. 7B are examples of schematic flowcharts of two possible methods for determining hash algorithm information for load balancing according to embodiments of this application. As shown in FIG. 7A, the method further includes the following steps.

S601: A load balancing device determines that a second communication device is a secondary device.

The load balancing device determines a primary-secondary relationship among the first communication device and the second communication device in a plurality of manners. For example, a priority of the first communication device and a priority of the second communication device may be compared, a device with a higher priority is a primary device, and a device with a lower priority is the secondary device. For another example, a MAC address of the first communication device and a MAC address of the second communication device may be compared, or a device with a smaller MAC address may be agreed as a primary device.

In a possible implementation, it may be agreed that hash algorithm information of the secondary device may change with hash algorithm information of the primary device. Based on this, subsequent S602 and S603 are performed when it is determined that the second communication device is the secondary device in S601. If there is another agreement premise, for example, if it is agreed that hash algorithm information of the primary device may change with hash algorithm information of the secondary device, S601 may be replaced as determining that the second communication device is a primary device, and S602 and S603 are performed only when this premise is met.

S602: The load balancing device determines whether hash algorithm information that meets a first condition exists.

If yes, S603 is performed.

If no, S604 is performed.

S603: The load balancing device determines the hash algorithm information that meets the first condition as the second hash algorithm information.

S603 is similar to the manner of S402, and mutual reference may be made to each other. Details are not described again.

S604: The load balancing device updates the second communication device as the primary device.

In S604, the load balancing device may further update the first communication device as the primary device, or may send a message to the first communication device, to notify the first communication device that the second communication device is updated as the primary device, so that the first communication device updates the first communication device as the secondary device. There are a plurality of manners of changing the second communication device as the primary device. For example, a priority of the second communication device may be changed.

S605: The load balancing device selects fourth hash algorithm information, where the fourth hash algorithm information is hash algorithm information used by the second communication device to forward a packet.

In S605, the fourth hash algorithm information selected by the load balancing device may be selected from preset hash algorithm information.

S606: The load balancing device sends a third message to the first communication device, where the third message indicates the first communication device to update, based on the fourth hash algorithm information and information about a second quantity of second ports of the second communication device, a hash algorithm corresponding to a load balancing mode of the first communication device.

In S606, the hash algorithm may be reselected for the first communication device, to alleviate network polarization. For a solution of selecting the hash algorithm and another parameter in the hash algorithm information for the first communication device, refer to the foregoing method for selecting the second hash algorithm information for the second communication device. Details are not described herein again.

The third message may indicate the first communication device to update, based on the fourth hash algorithm information and the information about the second quantity of second ports of the second communication device, a hash algorithm corresponding to one time of a load balancing mode (for example, layer 2 or layer 3 load balancing) or hash algorithms corresponding to a plurality of times of load balancing (for example, layer 2 and layer 3 load balancing) of the first communication device.

When the load balancing device and the second communication device are respectively two devices, the load balancing device may further send the fourth hash algorithm information to the second communication device, to notify the second communication device of the hash algorithm information used by the second communication device.

In another possible implementation, the load balancing device may reselect the hash algorithm information for the first communication device. For example, after S604, content of S607 and S608 in FIG. 7B may be performed for implementation.

S607: The load balancing device determines fifth hash algorithm information of the load balancing mode of the first communication device based on fourth hash algorithm information, information about a first quantity, and the information about the second quantity of second ports of the second communication device.

The fourth hash algorithm information meets a third condition, and the third condition includes: Two hash modulus values obtained by separately performing a modulo operation on the second quantity by using two hash values obtained by separately performing hash calculation on a third packet and a fourth packet based on the fourth hash algorithm information are different. In this way, the third packet and the fourth packet may be sent on the second communication device through two links, thereby alleviating network polarization.

The third packet and the fourth packet may be packets sent by another communication device to the second communication device after the another communication device performs load balancing on the third packet and the fourth packet based on the fifth hash algorithm information and the first quantity. In another possible implementation, the third condition further includes: Two hash modulus values obtained by separately performing a modulo operation on the first quantity by using two hash values are the same, where the hash values are obtained by separately performing hash calculation on the third packet and the fourth packet based on the fifth hash algorithm information. In this way an upper-level device of the second communication device may send the third packet and the fourth packet to the second communication device after performing load balancing on the third packet and the fourth packet based on the fifth hash algorithm information and the first quantity. Further, the third packet and the fourth packet may be sent on the second communication device through two links, thereby alleviating network polarization.

In S607, the load balancing device may reselect a hash algorithm for the first communication device, to alleviate network polarization. For a solution of selecting the hash algorithm and another parameter in the hash algorithm information for the first communication device, refer to the foregoing method for selecting the second hash algorithm information for the second communication device. Details are not described herein again.

A solution in which the load balancing device selects the fourth hash algorithm information is similar to content in which the load balancing device selects the second hash algorithm information. Details are not described herein again.

In still another possible implementation, the load balancing device may further determine seventh hash algorithm information of the load balancing mode of the first communication device based on the fourth hash algorithm information, the information about the first quantity, and the information about the second quantity of second ports of the second communication device. The fifth hash algorithm information and the seventh hash algorithm information may be respectively hash algorithm information of two times of load balancing of the first communication device, for example, may be respectively hash algorithm information corresponding to layer-3 load balancing and layer-2 load balancing.

S608: The load balancing device sends a fourth message to the first communication device, where the fourth message is used to indicate the first communication device to forward the packet based on the fifth hash algorithm information.

In S608, after reselecting the hash algorithm information for the first communication device, the hash algorithm information may notify the first communication device of the hash algorithm information through the fourth message, so that the first communication device forwards a packet based on the reselected fifth hash algorithm information.

In this embodiment of this application, if the load balancing device is a device independent of the first communication device and the second communication device, the load balancing device may separately exchange information with the first communication device and the second communication device to implement the solution in this embodiment of this application. If the load balancing device is located in the second communication device, the first communication device and the second communication device may mutually exchange information to implement the foregoing solution. It can be learned from the foregoing content that, through information exchange, the load balancing device can select more proper hash algorithm information for the first communication device and the second communication device with reference to the information of the first communication device and the information of the second communication device, so that polarization can be alleviated.

In this embodiment of this application, at least one of the first hash algorithm information or the information about the first quantity is carried in the following information: a link layer discovery protocol (LLDP) message, an open shortest path first protocol (open shortest path first, OSPF) message, a border gateway routing protocol (border gateway protocol, BGP) message, or a link aggregation control protocol (LACP) message.

FIG. 8A is an example of a schematic diagram of a structure of an extended LLDP message used to carry first hash algorithm information and information about a first quantity according to an embodiment of this application.

As shown in FIG. 8A, the extended LLDP message may include a TLV header (header) and a TLV information string (information string). The TLV header (header) may include a TLV type (type) and a TLV information string length (information string length). The TLV information string (information string) may include 802.1 OUI 00-80-C2 (three octets), an 802.1 subtype (subtype)=21 (one octet), a device type (one octet), a hash algorithm encoding identifier (hash code ID) (one octet), and members of group (one octet). The device type may be used to indicate an entity type, for example, a vendor model of a switch chip and a version of a server for implementing link bonding, used by a data plane to implement traffic load balancing, and may be uniformly encoded.

As shown in FIG. 8A, the hash algorithm code identifier (hash code ID) (one octet) may be used to carry hash algorithm information, for example, at least one of the following parameters (for example, the parameter a1, the parameter a2, the parameter a3, and the parameter a4) in the hash algorithm information: a hash algorithm, a parameter item of hash key information, an arrangement order of parameter items of the hash key information, or a manner of obtaining a hash value. In a possible implementation, different combinations of the parameters (for example, the parameter a1, the parameter a2, the parameter a3, and the parameter a4) in the hash algorithm information may be encoded and identified. In this way, a combination identifier is determined by using information carried in the field, and specific content of the parameter a1, the parameter a2, the parameter a3, or the parameter a4 in the combination is further determined based on the combination identifier, thereby reducing an amount of data carried in the field.

As shown in FIG. 8A, the members of group (one octet) may be used to carry the information about the first quantity.

FIG. 8B is an example of a schematic diagram of a structure of another OSPF (or referred to as OSPF Opaque) message used to carry first hash algorithm information and information about a first quantity according to an embodiment of this application.

As shown in FIG. 8B, the extended OSPF message may include a link state (LS) age, an option, an opaque type, an opaque identifier (opaque ID), an advertising router, an LS sequence number, an LS checksum, a length, a device type, a hash code identifier (hash code ID), and members of group.

FIG. 8C is an example of a schematic diagram of a structure of another BGP (or referred to as BGP Opaque) message used to carry first hash algorithm information and information about a first quantity according to an embodiment of this application. As shown in FIG. 8C, the BGP message includes an address family identifier (two octets), a subsequent address family identifier (one octet), a length of next-hop address (one octet, must be 0), a reserved bit (one octet, must be 0), an opaque key length (two octets), or opaque key data (four octets).

For the device type, the hash code identifier (hash code ID), and the members of group in FIG. 8B and FIG. 8C, refer to the content in FIG. 8A. Details are not described herein again. For a LAG/Trunk application scenario, the first hash algorithm information or the information about the first quantity may alternatively be carried in an LACP message, the carried information is similar to information carried in a protocol such as LLDP, and details are not described again.

Table 6 and Table 7 show examples of schematic tables of network utilization in the following content. In Table 6, the first communication device is the TOR-level communication device in FIG. 2A, the second communication device is the leaf-level communication device in FIG. 2A, and the two communication devices use same hash algorithm information. That is, a hash algorithm corresponding to the first hash algorithm information is the same as a hash algorithm corresponding to the second hash algorithm information, a parameter item of hash key information corresponding to the first hash algorithm information is the same as a parameter item of hash key information corresponding to the second hash algorithm information, an arrangement order of parameter items of the hash key information corresponding to the first hash algorithm information is the same as an arrangement order of parameter items of the hash key information corresponding to the second hash algorithm information, and a manner of obtaining a hash value corresponding to the first hash algorithm information is the same as a manner of obtaining a hash value corresponding to the second hash algorithm information.

TABLE 6

| Total quantity of flows in a "#flows" traffic model | Network utilization (%) in the case that both a quantity of uplink ports of the first communication device and a quantity of uplink ports of the second communication device are 4 | Network utilization (%) in the case that both a quantity of uplink ports of the first communication device and a quantity of uplink ports of the second communication device are 8 | Network utilization (%) in the case that both a quantity of uplink ports of the first communication device and a quantity of uplink ports of the second communication device are 16 | Network utilization (%) in the case that both a quantity of uplink ports of the first communication device and a quantity of uplink ports of the second communication device are 32 |
|---|---|---|---|---|
| 294912 | 25 | 12.5 | 6.25 | 3.125 |
| 589824 | 25 | 12.5 | 6.25 | 3.125 |
| 1179648 | 25 | 12.5 | 6.25 | 3.125 |
| 2359296 | 25 | 12.5 | 6.25 | 3.125 |
| 4718592 | 25 | 12.5 | 6.25 | 3.125 |
| 9437184 | 25 | 12.5 | 6.25 | 3.125 |
| 18874368 | 25 | 12.5 | 6.25 | 3.125 |
| 23592960 | 25 | 12.5 | 6.25 | 3.125 |

A first row in Table 6 is used as an example for description. When the total quantity of flows in the "#flows" traffic model is 294912, when both the quantity of uplink ports of the first communication device and the quantity of uplink ports of the second communication device are 4, the network utilization is 25%; when both the quantity of uplink ports of the first communication device and the quantity of uplink ports of the second communication device are 8, the network utilization is 12.5%; when both the quantity of uplink ports of the first communication device and the quantity of uplink ports of the second communication device are 16, the network utilization is 6.25%; or when both the quantity of uplink ports of the first communication device and the quantity of uplink ports of the second communication device are 32, the network utilization is 3.125%. Content of other rows is similar and is not described herein. It can be learned from Table 6 that, when the first communication device and the second communication device use the same hash algorithm information, network utilization is relatively low, and polarization occurs.

In Table 7, the first communication device is the TOR-level communication device in FIG. 2A, the second communication device is the leaf-level communication device in FIG. 2A, a hash algorithm corresponding to the first hash algorithm information is CRC16b, and a hash algorithm corresponding to the second hash algorithm information is CRC32LO. The CRC algorithm is usually identified by a generator polynomial. CRC16b and CRC32LO are CRC code names. A CRC generator polynomial corresponding to CRC16b is 0×1021. A CRC generator polynomial corresponding to CRC32LO is 0×1EDC6F41, where the prefix 0×indicates that the numeral is expressed in a hexadecimal notation. A parameter item of hash key information corresponding to the first hash algorithm information is the same as a parameter item of hash key information corresponding to the second hash algorithm information, an arrangement order of parameter items of the hash key information corresponding to the first hash algorithm information is the same as an arrangement order of parameter items of the hash key information corresponding to the second hash algorithm information, and a manner of obtaining a hash value corresponding to the first hash algorithm information is the same as a manner of obtaining a hash value corresponding to the second hash algorithm information.

TABLE 7

| Total quantity of flows in a "#flows" traffic model | Network utilization (%) in the case that both a quantity of uplink ports of the first communication device and a quantity of uplink ports of the second communication device are 4 | Network utilization (%) in the case that both a quantity of uplink ports of the first communication device and a quantity of uplink ports of the second communication device are 8 | Network utilization (%) in the case that both a quantity of uplink ports of the first communication device and a quantity of uplink ports of the second communication device are 16 | Network utilization (%) in the case that both a quantity of uplink ports of the first communication device and a quantity of uplink ports of the second communication device are 32 |
|---|---|---|---|---|
| 294912 | 99.9 | 99.9 | 98.814 | 95.238 |
| 589824 | 99.9 | 99.9 | 99.206 | 98.814 |
| 1179648 | 100 | 100 | 99.305 | 99.010 |
| 2359296 | 100 | 100 | 99.9 | 99.701 |
| 4718592 | 100 | 100 | 100 | 99.8 |
| 9437184 | 99.9 | 100 | 99.8 | 99.701 |
| 18874368 | 100 | 100 | 100 | 99.9 |
| 23592960 | 100 | 100 | 100 | 99.9 |

A first row in Table 7 is used as an example for description. When the total quantity of flows in the "#flows" traffic model is 294912, when both the quantity of uplink ports of the first communication device and the quantity of uplink ports of the second communication device are 4, the network utilization is 99.9%; when both the quantity of uplink ports of the first communication device and the quantity of uplink ports of the second communication device are 8, the network utilization is 99.9%; when both the quantity of uplink ports of the first communication device and the quantity of uplink ports of the second communication device are 16, the network utilization is 98.814%; or when both the quantity of uplink ports of the first communication device and the quantity of uplink ports of the second communication device are 32, the network utilization is 95.238%. Content of other rows is similar and is not described herein. It can be learned from Table 7 that, after the solution provided in this embodiment of this application is applied, network utilization can be improved, and network polarization can be alleviated.

It may be understood that, to implement the functions in the foregoing embodiments, the load balancing device includes a corresponding hardware structure and/or software module for performing each function. A person skilled in the art should be easily aware that, in combination with the units and the method steps in the examples described in the embodiments disclosed in this application, this application can be implemented by using hardware or a combination of hardware and computer software. Whether a function is performed by using hardware or hardware driven by computer software depends on particular application scenarios and design constraint conditions of the technical solutions.

Figure 10:
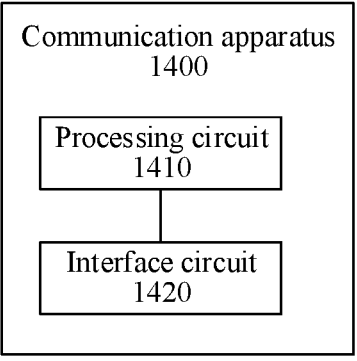
FIG. 10 is a schematic diagram of a structure of another communication apparatus according to an embodiment of this application.
Figure 11:
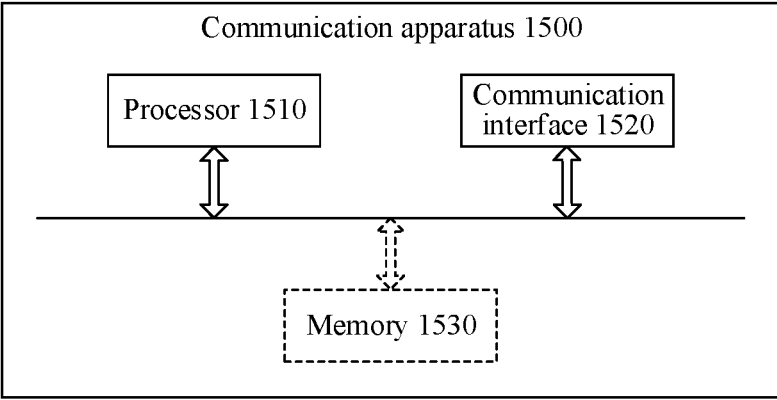
FIG. 11 is a schematic diagram of a structure of still another communication apparatus according to an embodiment of this application.

FIG. 9, FIG. 10, and FIG. 11 are schematic diagrams of structures of possible communication apparatuses according to embodiments of this application. These communication apparatuses can be configured to implement functions of the load balancing device in the foregoing method embodiments, and therefore can also implement beneficial effects of the foregoing method embodiments. In this embodiment of this application, the communication apparatus may be the load balancing device shown in FIG. 1A, FIG. 1B, FIG. 1C, or FIG. 1D, or may be a module (for example, a chip) applied to the load balancing device.

As shown in FIG. 9, a communication apparatus 1300 includes a processing unit 1310 and a transceiver unit 1320. The communication apparatus 1300 is configured to implement the functions of the load balancing device in the method embodiment shown in FIG. 4, FIG. 6, FIG. 7A, or FIG. 7B.

When the communication apparatus 1300 is configured to implement the functions of the load balancing device in the method embodiment shown in FIG. 4, FIG. 6, FIG. 7A, or FIG. 7B, the processing unit 1310 is configured to: receive a first message through the transceiver unit 1320, where the first message includes first hash algorithm information of a load balancing mode of a first communication device and information about a first quantity of first ports of the first communication device; and determine second hash algorithm information of a load balancing mode of the second communication device based on the first hash algorithm information and the information about the first quantity.

For more detailed descriptions of the processing unit 1310 and the transceiver unit 1320, directly refer to related descriptions in the method embodiment shown in FIG. 4, FIG. 6, FIG. 7A, or FIG. 7B. Details are not described herein again.

As shown in FIG. 10, a communication apparatus 1400 includes a processing circuit 1410 and an interface circuit 1420. The processing circuit 1410 and the interface circuit 1420 are coupled to each other. It may be understood that the interface circuit 1420 may be a transceiver or an input/output interface. Optionally, the communication apparatus 1400 may further include a memory, configured to store instructions executed by the processing circuit, store input data required by the processing circuit 1410 to run the instructions, or store data generated after the processing circuit 1410 runs the instructions.

When the communication apparatus 1400 is configured to implement the method shown in FIG. 4, FIG. 6, FIG. 7A, or FIG. 7B, the processing circuit 1410 is configured to implement functions of the processing unit 1310, and the interface circuit 1420 is configured to implement functions of the transceiver unit 1320.

As shown in FIG. 11, a communication apparatus 1500 includes a processor 1510 and a communication interface 1520. The processor 1510 and the communication interface 1520 are coupled to each other. It may be understood that the communication interface 1520 may be a transceiver or an input/output interface. Optionally, the communication apparatus 1500 may further include a memory 1530, configured to store instructions executed by the processor 1510, or store input data required by the processor 1510 to run the instructions, or store data generated after the processor 1510 runs the instructions.

When the communication apparatus 1500 is configured to implement the method shown in FIG. 4, FIG. 6, FIG. 7A, or FIG. 7B, the processor 1510 is configured to implement functions of the processing unit 1310, and the communication interface 1520 is configured to implement functions of the transceiver unit 1320.

When the communication apparatus 1500 is configured to implement the functions of the load balancing device in the method embodiment shown in FIG. 4, FIG. 6, FIG. 7A, or FIG. 7B, the processor 1510 is configured to: receive a first message through the communication interface 1520, where the first message includes first hash algorithm information of a load balancing mode of a first communication device and information about a first quantity of first ports of the first communication device; and determine second hash algorithm information of a load balancing mode of the second communication device based on the first hash algorithm information and the information about the first quantity.

In a possible implementation, the processor 1510 is configured to determine the second hash algorithm information based on the first hash algorithm information, the information about the first quantity, and information about a second quantity of second ports of the second communication device.

In a possible implementation, the processor 1510 is further configured to receive a second message through the communication interface, where the second message includes third hash algorithm information of the load balancing mode of the first communication device and information about a third quantity of third ports of the first communication device; and determine the second hash algorithm information of the load balancing mode of the second communication device based on the first message and the second message.

In a possible implementation, the processor 1510 is configured to determine the second hash algorithm information of the load balancing mode of the second communication device based on the first message, the second message, and the information about the second quantity of second ports of the second communication device.

In a possible implementation, the processor 1510 is configured to query a preset hash algorithm information association relationship based on the first hash algorithm information and the information about the first quantity, to obtain the second hash algorithm information. The hash algorithm information association relationship includes an association relationship among the first hash algorithm information, the information about the first quantity, the information about the second quantity of second ports of the second communication device, and the second hash algorithm information.

In a possible implementation, the processor 1510 is configured to: determine a fourth quantity corresponding to hash algorithm information in N pieces of hash algorithm information, where N is a positive integer; and select, from the N pieces of hash algorithm information, hash algorithm information whose corresponding fourth quantity is greater than 1 as the second hash algorithm information. For the hash algorithm information in the N pieces of hash algorithm information, the fourth quantity corresponding to the hash algorithm information is a deduplicated quantity of M hash modulus values obtained by separately performing a modulo operation on the second quantity of second ports of the second communication device by using M hash values, where the M hash values are obtained by separately performing hash calculation on M packets based on the hash algorithm information, and M is an integer greater than 1.

In a possible implementation, the processor 1510 is configured to select, from the N pieces of hash algorithm information, hash algorithm information whose corresponding fourth quantity is largest as the second hash algorithm information.

In a possible implementation, the processor 1510 is further configured to: determine that the second hash algorithm information meeting the first condition does not exist, and determine fourth hash algorithm information of the load balancing mode of the second communication device; and send a third message to the first communication device through the communication interface 1520, where the third message indicates the first communication device to update, based on the fourth hash algorithm information and the information about the second quantity of second ports of the second communication device, the hash algorithm information corresponding to the load balancing mode of the first communication device. The first condition includes: Two hash modulus values obtained by separately performing a modulo operation on the second quantity of second ports of the second communication device by using two hash values are different, where the two hash values are obtained by separately performing hash calculation on the first packet and the second packet based on the second hash algorithm information.

In a possible implementation, the processor 1510 is further configured to: determine that the second hash algorithm information meeting the first condition does not exist, and determine fourth hash algorithm information of the load balancing mode of the second communication device; determine fifth hash algorithm information of the load balancing mode of the first communication device based on the fourth hash algorithm information, the information about the first quantity, and the information about the second quantity of second ports of the second communication device; and send a fourth message to the first communication device through the communication interface 1520, where the fourth message is used to indicate the first communication device to forward the packet based on the fifth hash algorithm information.

In a possible implementation, the processor 1510 is further configured to: determine that the second communication device is a secondary device; and determine that the second hash algorithm information meeting the first condition does not exist, and update the second communication device as a primary device.

When the communication apparatus is a chip applied to the load balancing device. the chip implements the functions of the load balancing device in the foregoing method embodiment. The chip receives information from another module in the load balancing device, where the information is sent by another device to the load balancing device; or the chip sends information to another module in the load balancing device, where the information is sent by the load balancing device to another device.

It may be understood that the processor in embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or any regular processor or the like.

According to the methods provided in embodiments of this application, this application further provides a computer program product. The computer program product includes computer program code or instructions. When the computer program code or the instructions runs/run on a computer, the computer is enabled to perform the method in any one of the embodiments shown in FIG. 4, FIG. 6, FIG. 7A, or FIG. 7B.

According to the methods provided in embodiments of this application, this application further provides a computer-readable storage medium. The computer-readable medium stores program code. When the program code is run on a computer, the computer is enabled to perform the method in any one of the embodiments shown in FIG. 4, FIG. 6, FIG. 7A, and FIG. 7B.

According to the methods provided in embodiments of this application, this application further provides a chip system. The chip system may include a processor. The processor is coupled to a memory, and can be configured to perform the method in any one of the embodiments shown in FIG. 4, FIG. 6, FIG. 7A, or FIG. 7B. Optionally, the chip system further includes the memory. The memory is configured to store a computer program (which may also be referred to as code or instructions). The processor is configured to invoke the computer program from the memory and run the computer program, to enable a device on which the chip system is installed to perform the method in any one of the embodiments shown in FIG. 4, FIG. 6, FIG. 7A, or FIG. 7B.

According to the methods provided in embodiments of this application, this application further provides a system, including the foregoing load balancing device and the foregoing network device.

The method steps in embodiments of this application may be implemented through hardware, or may be implemented by executing software instructions by the processor. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk drive, a removable hard disk, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in the load balancing device. Certainly, the processor and the storage medium may exist as discrete components in the load balancing device.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer programs or instructions. When the computer programs or the instructions are loaded and executed on a computer, the procedures or functions in embodiments of this application are all or partially performed. The computer may be a general-purpose computer, a dedicated computer, a computer network, a network device, user equipment, or another programmable apparatus. The computer programs or the instructions may be stored in a computer-readable storage medium or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium, for example, a floppy disk, a hard disk drive, or a magnetic tape; or may be an optical medium, for example, a digital video disc; or may be a semiconductor medium, for example, a solid state drive. The computer-readable storage medium may be a volatile or non-volatile storage medium, or may include two types of storage media: a volatile storage medium and a non-volatile storage medium.

It should be noted that a part of this patent application document includes copyright-protected content. The copyright owner reserves the copyright except copies are made for the patent documents or the recorded content of the patent documents in the Intellectual Property Administration.

In embodiments of this application, unless otherwise stated or there is a logic conflict, terms and/or descriptions between different embodiments are consistent and may be mutually referenced, and technical features in different embodiments may be combined into a new embodiment based on an internal logical relationship thereof.

"A plurality of" in this application refers to two or more than two. "And/or" describes an association relationship among associated objects and indicates that three relationships may exist. For example, A and/or B may indicate the following three cases: Only A exists, both A and B exist, and only B exists, where A and B may be singular or plural. In the text descriptions of this application, the character "/" generally indicates an "or" relationship among the associated objects. In a formula in this application, the character "/" indicates a "division" relationship among the associated objects. "Including at least one of A, B, and C" may indicate: including A; including B; including C; including A and B; including A and C; including B and C; and including A, B, and C.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes.

What is claimed is:

1. A method for determining hash algorithm information for load balancing, comprising:
   receiving a first message, wherein the first message comprises first hash algorithm information of a load balancing mode of a first communication device and information about a first quantity of first ports of the first communication device; and
   determining second hash algorithm information of a load balancing mode of a second communication device based on the first hash algorithm information and the information about the first quantity, wherein the determining the second hash algorithm information of the load balancing mode of the second communication device comprises:
      querying a preset hash algorithm information association relationship based on the first hash algorithm information and the information about the first quantity, to obtain the second hash algorithm information, wherein the hash algorithm information association relationship comprises an association relationship among the first hash algorithm information, the information about the first quantity, information about a second quantity of second ports of the second communication device, and the second hash algorithm information.

2. The method according to claim 1, wherein the first hash algorithm information and the second quantity of second ports of the second communication device meet at least one of the following:
   the first quantity is different from the second quantity, and the first hash algorithm information is the same as the second hash algorithm information;
   the first quantity is different from the second quantity, and the first hash algorithm information is different from the second hash algorithm information; or
   the first quantity is the same as the second quantity, and the first hash algorithm information is different from the second hash algorithm information.

3. The method according to claim 1,
   wherein the first hash algorithm information comprises at least one of the following:
      a first hash algorithm, a parameter item of first hash key information, an arrangement order of parameter items of the first hash key information, or a manner of obtaining a first hash value; and
   the second hash algorithm information comprises at least one of the following:
      a second hash algorithm, a parameter item of second hash key information, an arrangement order of parameter items of the second hash key information, or a manner of obtaining a second hash value.

4. The method according to claim 3, wherein the first hash algorithm information is different from the second hash algorithm information, and the first hash algorithm information and the second hash algorithm information meet at least one of the following:
   the first hash algorithm is different from the second hash algorithm;

the parameter item of the first hash key information is different from the parameter item of the second hash key information;

the arrangement order of parameter items of the first hash key information is different from the arrangement order of parameter items of the second hash key information; or the manner of obtaining the first hash value is different from the manner of obtaining the second hash value.

5. The method according to claim 1, wherein the first quantity comprises:

a quantity of equal-cost multi-path group (ECMP group) members of the first communication device; or a quantity of link aggregation group (LAG group) members of the first communication device.

6. The method according to claim 1, wherein before the determining the second hash algorithm information of the load balancing mode of the second communication device based on the first hash algorithm information and the information about the first quantity, the method further comprises:

receiving a second message, wherein the second message comprises third hash algorithm information of the load balancing mode of the first communication device and information about a third quantity of third ports of the first communication device; and the determining the second hash algorithm information of the load balancing mode of the second communication device comprises:

determining the second hash algorithm information of the load balancing mode of the second communication device based on the first message and the second message.

7. The method according to claim 6, wherein the first quantity comprises a quantity of equal-cost multi-path group (ECMP group) members of the first communication device, and the third quantity comprises a quantity of link aggregation group (LAG group) members of the first communication device.

8. The method according to claim 1, wherein the second hash algorithm information meets a first condition, and the first condition comprises:

two hash modulus values obtained by separately performing a modulo operation on the second quantity of second ports of the second communication device by using two hash values are different, wherein the two hash values are obtained by separately performing hash calculation on a first packet and a second packet based on the second hash algorithm information.

9. A method for determining hash algorithm information for load balancing, comprising:

receiving a first message, wherein the first message comprises first hash algorithm information of a load balancing mode of a first communication device and information about a first quantity of first ports of the first communication device; and determining second hash algorithm information of a load balancing mode of a second communication device based on the first hash algorithm information and the information about the first quantity, wherein the determining the second hash algorithm information of the load balancing mode of the second communication device comprises:

determining a fourth quantity corresponding to hash algorithm information in N pieces of hash algorithm information, wherein N is a positive integer; and selecting, from the N pieces of hash algorithm information, hash algorithm information whose corresponding fourth quantity is greater than 1 as the second hash algorithm information, wherein for the hash algorithm information in the N pieces of hash algorithm information, the fourth quantity corresponding to the hash algorithm information is:

a deduplicated quantity of M hash modulus values obtained by separately performing a modulo operation on the second quantity of second ports of the second communication device by using M hash values, wherein the M hash values are obtained by separately performing hash calculation on M packets based on the hash algorithm information, and M is an integer greater than 1.

10. A device for determining hash algorithm information for load balancing, comprising:

a communication interface; and a processor, wherein the processor is configured to:

receive a first message through the communication interface, wherein the first message comprises first hash algorithm information of a load balancing mode of a first communication device and information about a first quantity of first ports of the first communication device; and determine second hash algorithm information of a load balancing mode of a second communication device based on the first hash algorithm information and the information about the first quantity, wherein the determining the second hash algorithm information of the load balancing mode of the second communication device comprises:

querying a preset hash algorithm information association relationship based on the first hash algorithm information and the information about the first quantity, to obtain the second hash algorithm information, wherein the hash algorithm information association relationship comprises an association relationship among the first hash algorithm information, the information about the first quantity, information about a second quantity of second ports of the second communication device, and the second hash algorithm information.

11. The device according to claim 10, wherein the first hash algorithm information and the second quantity of second ports of the second communication device meet at least one of the following:

the first quantity is different from the second quantity, and the first hash algorithm information is the same as the second hash algorithm information;

the first quantity is different from the second quantity, and the first hash algorithm information is different from the second hash algorithm information; or the first quantity is the same as the second quantity, and the first hash algorithm information is different from the second hash algorithm information.

12. The device according to claim 10, wherein the first hash algorithm information comprises at least one of the following:

a first hash algorithm, a parameter item of first hash key information, an arrangement order of parameter items of the first hash key information, or a manner of obtaining a first hash value; and the second hash algorithm information comprises at least one of the following:

a second hash algorithm, a parameter item of second hash key information, an arrangement order of parameter items of the second hash key information, or a manner of obtaining a second hash value.

13. The device according to claim 12, wherein the first hash algorithm information is different from the second hash algorithm information, and the first hash algorithm information and the second hash algorithm information meet at least one of the following:

the first hash algorithm is different from the second hash algorithm;

the parameter item of the first hash key information is different from the parameter item of the second hash key information;

the arrangement order of parameter items of the first hash key information is different from the arrangement order of parameter items of the second hash key information; or the manner of obtaining the first hash value is different from the manner of obtaining the second hash value.

14. The device according to claim 10, wherein the first quantity comprises:

a quantity of equal-cost multi-path group (ECMP group) members of the first communication device; or a quantity of link aggregation group (LAG group) members of the first communication device.

15. The device according to claim 10, wherein the processor is further configured to:

receive a second message through the communication interface, wherein the second message comprises third hash algorithm information of the load balancing mode of the first communication device and information about a third quantity of third ports of the first communication device; and determine the second hash algorithm information of the load balancing mode of the second communication device based on the first message and the second message.

16. The device according to claim 15, wherein the first quantity comprises a quantity of equal-cost multi-path group (ECMP group) members of the first communication device, and the third quantity comprises a quantity of link aggregation group (LAG group) members of the first communication device.

17. The device according to claim 10, wherein the second hash algorithm information meets a first condition, and the first condition comprises:

two hash modulus values obtained by separately performing a modulo operation on the second quantity of second ports of the second communication device by using two hash values are different, wherein the two hash values are obtained by separately performing hash calculation on a first packet and a second packet based on the second hash algorithm information.

* * * * *